(12) United States Patent
Kano et al.

(10) Patent No.: US 6,667,846 B2
(45) Date of Patent: Dec. 23, 2003

(54) INFORMATION STORAGE DEVICE HAVING TAPE CASSETTE WITH NONCONTACT MEMORY AND ANTENNA

(75) Inventors: Yasuaki Kano, Kanagawa (JP); Kazuyuki Hirooka, Kanagawa (JP); Atsushi Ito, Kanagawa (JP); Toru Hasegawa, Tokyo (JP)

(73) Assignee: Sony Corporation, Tokyo (JP)

( * ) Notice: Subject to any disclaimer, the term of this patent is extended or adjusted under 35 U.S.C. 154(b) by 282 days.

(21) Appl. No.: 09/849,008

(22) Filed: May 4, 2001

(65) Prior Publication Data

US 2002/0015261 A1 Feb. 7, 2002

(30) Foreign Application Priority Data

May 8, 2000 (JP) .................................... P2000-139421
Aug. 21, 2000 (JP) .................................... P2000-254262

(51) Int. Cl.⁷ ..................... G11B 15/675; G11B 23/087
(52) U.S. Cl. ....................... 360/96.5; 360/132; 360/137
(58) Field of Search .......................... 360/96.5, 96.6, 360/99.02, 99.06, 132, 133, 137; 369/77.1, 77.2

(56) References Cited

U.S. PATENT DOCUMENTS

| | | | | | |
|---|---|---|---|---|---|
| 6,065,701 | A | * | 5/2000 | Tanimura et al. | 360/132 |
| 6,452,749 | B1 | * | 9/2002 | Ota et al. | 360/132 |
| 6,496,314 | B1 | * | 12/2002 | Ota et al. | 360/132 |
| 2002/0023956 | A1 | * | 2/2002 | Kaneko | 235/385 |

FOREIGN PATENT DOCUMENTS

| | | | |
|---|---|---|---|
| EP | 1 041 562 | * | 10/2000 |
| JP | 10-149600 | * | 6/1998 |
| JP | 10-172211 | * | 6/1998 |
| JP | 10-177776 | * | 6/1998 |
| JP | 10-188522 | * | 7/1998 |
| JP | 10-199066 | * | 7/1998 |
| JP | 10-199067 | * | 7/1998 |
| JP | 10-199216 | * | 7/1998 |
| JP | 10-214476 | * | 8/1998 |
| JP | 10-214477 | * | 8/1998 |
| JP | 10-222890 | * | 8/1998 |
| JP | 10-255441 | * | 9/1998 |
| JP | 10-269744 | * | 10/1998 |
| WO | WO 00/17880 | * | 3/2000 |

* cited by examiner

*Primary Examiner*—Craig A. Renner
(74) *Attorney, Agent, or Firm*—Jay H. Maioli

(57) ABSTRACT

A tape cassette includes an MIC (Memory-In-Cassette) installed inside the center section of the label surface, and a case capable of housing the magnetic tape. A switch circuit board is installed in the front part of the chassis parallel to the inner side of the front panel, and a communications antenna is mounted on this switch circuit board. When the cassette is loaded in the chassis from the cassette insertion slot, the MIC is in proximity to the front of the communications antenna and wireless communications between the antenna and MIC are carried out with high accuracy. By efficiently installing an MIC in a tape cassette having little excess space such as DAT (digital audio tape recorder) cassettes, an increase in the number of parts and the number of assembly processes can be avoided and highly accurate reading and writing of control information on the MIC in the cassette can be performed.

3 Claims, 18 Drawing Sheets

FIG.16

| IDENTIFICATION HOLES | | | | TAPE THICKNESS | TAPE TYPE | TRACK WIDTH | RECORDED TAPE | FORMAT |
|---|---|---|---|---|---|---|---|---|
| 16b | 16c | 16d | 16e | | | | | |
| 0 | 0 | 0 | 0 | 13 μm | METAL TAPE (MP) | 13.6 μm | NO | DDS |
| 0 | 0 | 0 | 1 | 13 μm | METAL TAPE (MP) | 13.6 μm | YES | DDS |
| 0 | 0 | 0 | 0 | | CLEANING TAPE | | | |
| 0 | 0 | 1 | 1 | 13 μm | BARIUM-FERRITE TAPE | 20.4 μm | YES | DAT |
| 0 | 0 | 1 | 0 | 9 μm | METAL TAPE (MP) | 13.6 μm | NO | DDS |
| 0 | 0 | 1 | 1 | 9 μm | METAL TAPE (MP) | 13.6 μm | YES | DDS |
| 0 | 1 | 0 | 0 | | ACQUIRED | | | |
| 0 | 1 | 0 | 1 | 9 μm | BARIUM-FERRITE TAPE | 20.4 μm | YES | DAT |
| 0 | 1 | 1 | 0 | 6.9 μm | METAL TAPE (MP*) | 9.1 μm | NO | DDS-2 |
| 1 | 0 | 0 | 0 | | ACQUIRED | | | |
| 1 | 0 | 0 | 1 | 6.9 μm | METAL TAPE (MP**) | 9.1 μm | NO | DDS-3 |
| 1 | 0 | 1 | 0 | | ACQUIRED | | | |
| 1 | 0 | 1 | 1 | 5.9 μm | METAL TAPE (MP***) | 6.8 μm | NO | DDS-4 |
| 1 | 1 | 0 | 0 | | ACQUIRED | | | |
| 1 | 1 | 0 | 1 | | ACQUIRED | | | |
| 1 | 1 | 1 | 0 | | ACQUIRED | | | |
| 1 | 1 | 1 | 1 | | | | | DDS-5 | ns
INFORMATION STORAGE DEVICE HAVING TAPE CASSETTE WITH NONCONTACT MEMORY AND ANTENNA

BACKGROUND OF THE INVENTION

1. Field of the Invention

The present invention relates to an information storage device ideal for tape streamer drives and relates in particular to a MIC (memory-in-cassette) tape cassette involving technology for wireless communication of various types of control information through a communications antenna between a non-contact memory such as a MIC (memory-in-cassette) embedded inside a tape cassette and a circuit board when the tape cassette such as a DAT (digital audio tape recorder) cassette is loaded in the tape streamer drives.

2. Description of the Related Art

A tape streamer drive using for example a DAT cassette is known in the related art as an information storage device capable of recording and reproducing digital data on and from magnetic tape. Though the tape streamer drive constituting the recording medium (information recording medium) varies according to the length of the magnetic tape of the DAT cassette, the tape streamer drive is capable of recording (storing) vast amounts of information on the order of dozens and hundreds of gigabytes. This vast storage capability has led to wide use in applications such as backup of data stored on recording media such as hard disks inside computers. The tape streamer drive is also ideal for storing image data having a large data size.

DAT cassettes can also be inserted and removed from the tape streamer drive. Using this so-called removable media, the data in a plurality of tape streamer drives can be recorded and reproduced by utilizing the same DAT cassette.

However, the DAT cassette is marketed in many different types according to differences in material, thickness and length of the magnetic tape. The tape streamer drive comprises a detection means to identify the type of DAT cassette when a DAT cassette is loaded, and based on the results of the identification, record or reproduce the data in a format matching to the particular DAT cassette. In other words, a detailed identification of the type of DAT cassette is required in order to correspondingly record and reproduce in a stable manner on and from a particular DAT cassette which is different according to the magnetic tape length, thickness and material, etc.

So, DAT cassette is required to be embedded with a MIC (memory-in-cassette) constituting one type of non-contact memory stored beforehand with a plurality of control information for controlling the data format to match the differences in the material, thickness and length of the magnetic tape in the DAT cassette. The tape streamer drive is required to comprise a memory drive circuit containing a communications antenna, and when the DAT cassette is loaded inside the tape streamer drive, the reading and writing of control information for the MIC of the DAT cassette is performed by wireless communication with the communications antenna of the memory drive circuit. In this way, recording and reproducing of data is performed in the recording format matching the type of DAT cassette loaded in the tape streamer drive.

An example of such technology is disclosed in U.S. Pat. No. 5,791,578 by the applicants of the present invention, wherein the cassette housed a MIC (memory-in-cassette) having an electrical contact. However the electrical contact was unsatisfactory in terms of reliability and also had the problem that the many parts were required and the cost was high.

Further problems with this example of the related art were a lack of space when using a tape cassette conforming to DAT standards having tape with a width of 4 mm, and another problem was that the slider plate (such as using a thin metal plate) reduced the effectiveness of the antenna.

Also, the system control circuit for the tape streamer drive is usually mounted on the main circuit board installed horizontally on the bottom of the chassis within the tape streamer drive, so that the memory drive circuit and the communications antenna are preferably both mounted on the main circuit board.

However, tape streamer drive installs a cassette insertion (or loading) section having a plurality of cassette positioning pins and a pair of left/right reel shafts on the upper part of the chassis and normally a pair of left/right reel motors are installed on the bottom of the chassis to drive the pair of left/right reel shafts. Therefore, while the DAT cassette inserted from the cassette insertion slot on the front panel was loaded on a comparatively high position on the upper part of the chassis, the main circuit board must be installed at a low position on the lower side of the chassis to avoid the reel motor. So there was a longer distance between the communications antenna of the main circuit board and the MIC embedded with the DAT cassette, created the problem that the write read accuracy of the MIC information was unsatisfactory.

Whereupon, separating the communications antenna from the main circuit board by mounting a dedicated antenna circuit board was attempted, and that dedicated antenna circuit board installed near the MIC of the DAT cassette that was loaded. However, this method had the problem that since a dedicated antenna circuit board was required the number of parts and the number of assembly processes increased so that the cost became higher.

SUMMARY OF THE INVENTION

In view of the problems with the related art, the present invention has the object of providing a tape cassette and recording information device for performing highly accurate reading and writing of control information on MIC (memory-in-cassette) embedded in tape cassettes such as DAT without an increased number of parts and assembly processes.

The tape cassette relating to the present invention comprises a box capable of housing the magnetic tape, a magnetic tape guide opening formed at one end of the box, a rear section formed at the other end of the box facing the guide opening, and a memory installed in the interior at the center facing longitudinally along the rear section.

In the present invention, a memory is installed internally at the center facing longitudinally along the rear section of the tape cassette. The memory is therefore installed in a position that does not interfere with the wind diameter of the magnetic tape, etc.

In order to achieve the above objects, the information storage device of the present invention is comprised of a memory embedded in the rear side of the cassette which is to be inserted into the chassis from the cassette insertion slot on the front panel, control information of various types of information recording medium in that cassette, the switch circuit board installed on the front end of the chassis and also installed parallelly on the inner side of the front panel and of the communications antenna mounted on that switch circuit board. And when the cassette is loaded in the chassis, the memory of that cassette is in proximity to the front of the communications antenna on the switch board.

The information storage device of the present invention configured as described above, comprises a memory recorded with various types of control information embedded in the rear side of the cassette, and further comprises a communications antenna mounted on a horizontal switch circuit board on the inner side of the front panel at the front end of the chassis for carrying out communication of various types of control information in that memory, and the cassette memory can be placed in proximity to the front of the communications antenna on the switch circuit board, when the cassette is inserted in the chassis from the cassette insertion slot on the front panel.

BRIEF DESCRIPTION OF THE DRAWINGS

FIG. 16 is a drawing showing the types of DAT cassettes corresponding to the open/close patterns of the plurality of identification holes.

DETAILED DESCRIPTION OF THE PREFERRED EMBODIMENTS

Figure 1:
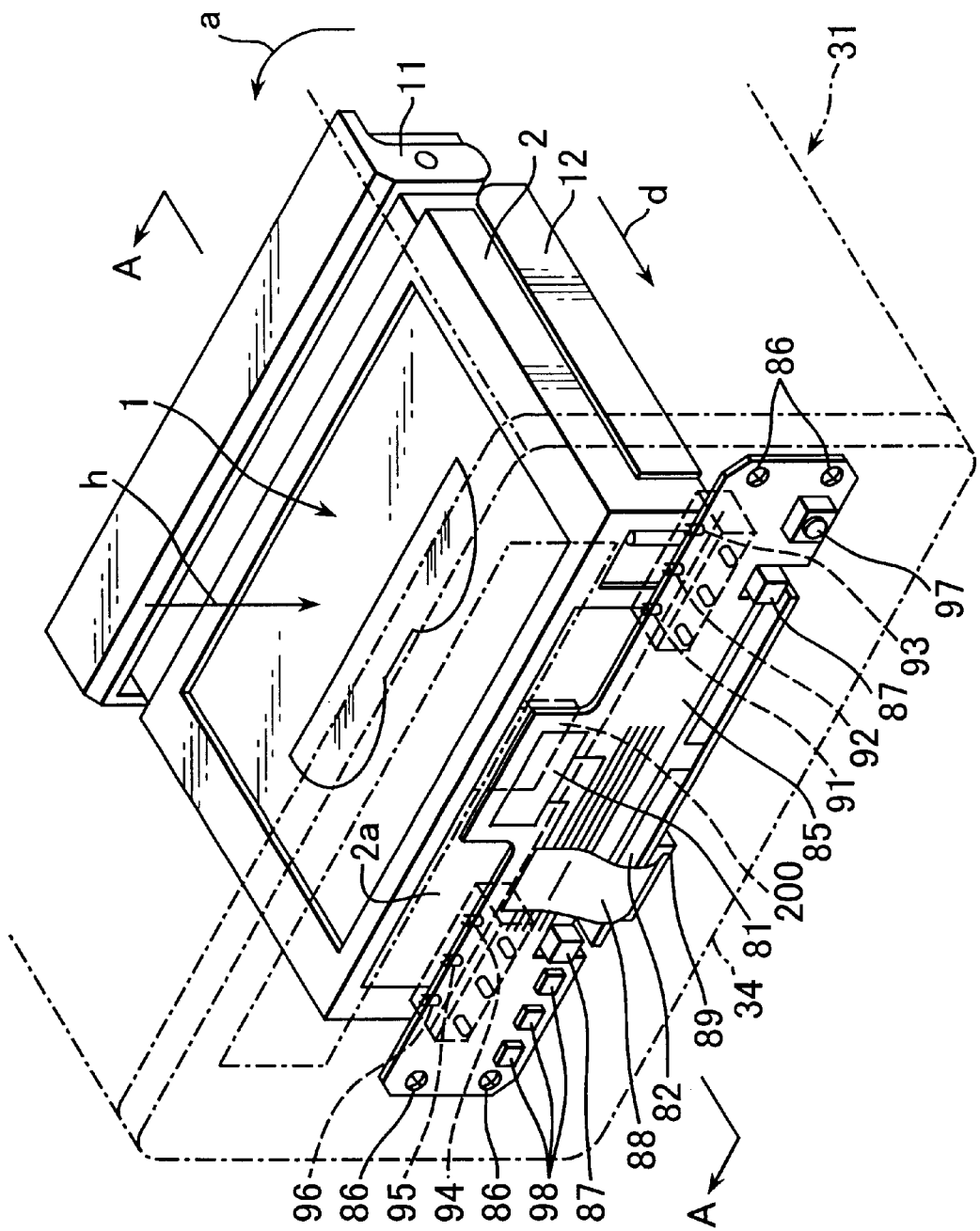
FIG. 1 is a perspective view of an essential portion of the embodiment in the DAT cassette and tape streamer drive of the present invention.

The embodiments of the DAT cassette and tape streamer drive of the present invention are described while referring to the accompanying drawings and in the following sequence.

(1) Description of DAT cassette (2) Description of tape streamer drive (3) Description involving MIC and communication antenna (4) Description of MIC and of tape streamer drive control circuit (1) Description of DAT Cassette One example of an information recording cassette constituted here by a DAT cassette 1 is described in FIGS. 1 and 2 and FIG. 5 through FIG. 12B. In the figures, a flat parallelepiped cassette box 2 comprises upper, lower shells 3, 4 formed from plastic. The interior of the cassette box 2 holds a magnetic tape 5 constituting the information recording medium and wound around the outer circumferences of the pair of left/right reel hubs 6A, 6B. A front opening 7 and a bottom rear opening 8 are formed on the two surfaces at the front edge and the rear surface of the front edge of the cassette box 2. The magnetic tape 5 is guided along the right/left pair of tape guides 9 formed perpendicularly on both left and right sides of the front edge within the cassette box 2 and is passed between the left/right pair of reel hubs 6A, 6B in the left and right directions spanning the front opening 7 and a rear opening 8.

A front lid 11 is installed for free opening and closing in the up and down directions of arrows a, b by means of the left/right pair of support pins 10 on the front edge of the cassette box 2. The front lid 7 is structured to open and close the front opening 7 from the front of the magnetic tape 5. This front lid 11 is forcibly rotated to a closed position in direction b by an internal spring (not shown in drawing). In the lower part of the lower shell 4 of cassette box 2, a slider 12 in a roughly cross sectional box shape open on the left side, is installed to slide freely forward and backward in the directions of arrows c and d. Left/right hub hole pairs 13, 14 are respectively formed in the slider 12 and the upper part of lower shell 4. When the slider 12 is slid in the direction of arrow c by the internal spring (not shown in drawing) up to the forward position shown by the solid line in FIG. 7, the left/right hub hole pair 13, of this slider 12 is displaced towards direction c versus the left/right hub hole pair 14 of the lower shell 4, so along with shutting the left/right hub hole pair 14 by the action of the slider 12, the bottom rear opening 8 of the cassette box 2 is also shut by the front edge of this slider 12. When the slider 12 slides to a rearward position shown by the dotted line in FIG. 7 in the direction of arrow d while resisting the internal spring, the left/right hub hole pair 13 of the slider overlaps directly below the left/right hub hole pair 14 of the lower shell 4, and along with opening the left/right hub hole pair 14, the bottom rear opening 8 of cassette box 2 is also opened.

An ID (identification) hole section 15 is formed in the bottom of shell 4 along the rear edge of the bottom of cassette cabinet 2. A total of at least five ID (identification) holes 16a through 16e are formed on the left and right ends of the ID hole section 15. A label attachment section 17 is formed on the outer side of the rear edge wall 2a constituting the rear edge of the cassette box 2. A write protector 18 is assembled into the one of the rear sides of the label attachment section 17 to slide freely in the left and right directions.

A pair of positioning pin holes 19 formed of true holes and slotted holes are formed on the bottom at the center of the left/right pair of tape guides 9 installed at the front edge of the cassette box 2.

The MIC 200 constituting the memory chip stored beforehand with control information such as the length, thickness and material of the magnetic tape 5, is embedded in a perpendicular position in the center position on the inner side of the rear edge wall 2a in the DAT cassette 1. The MIC 200 however is formed of a non-contact, non-volatile memory not having a contact point. A cavity may be formed in the label attachment section 17 of the rear edge wall 2a, and the MIC 200 is embedded inside this cavity facing outwards.

Figure 8:
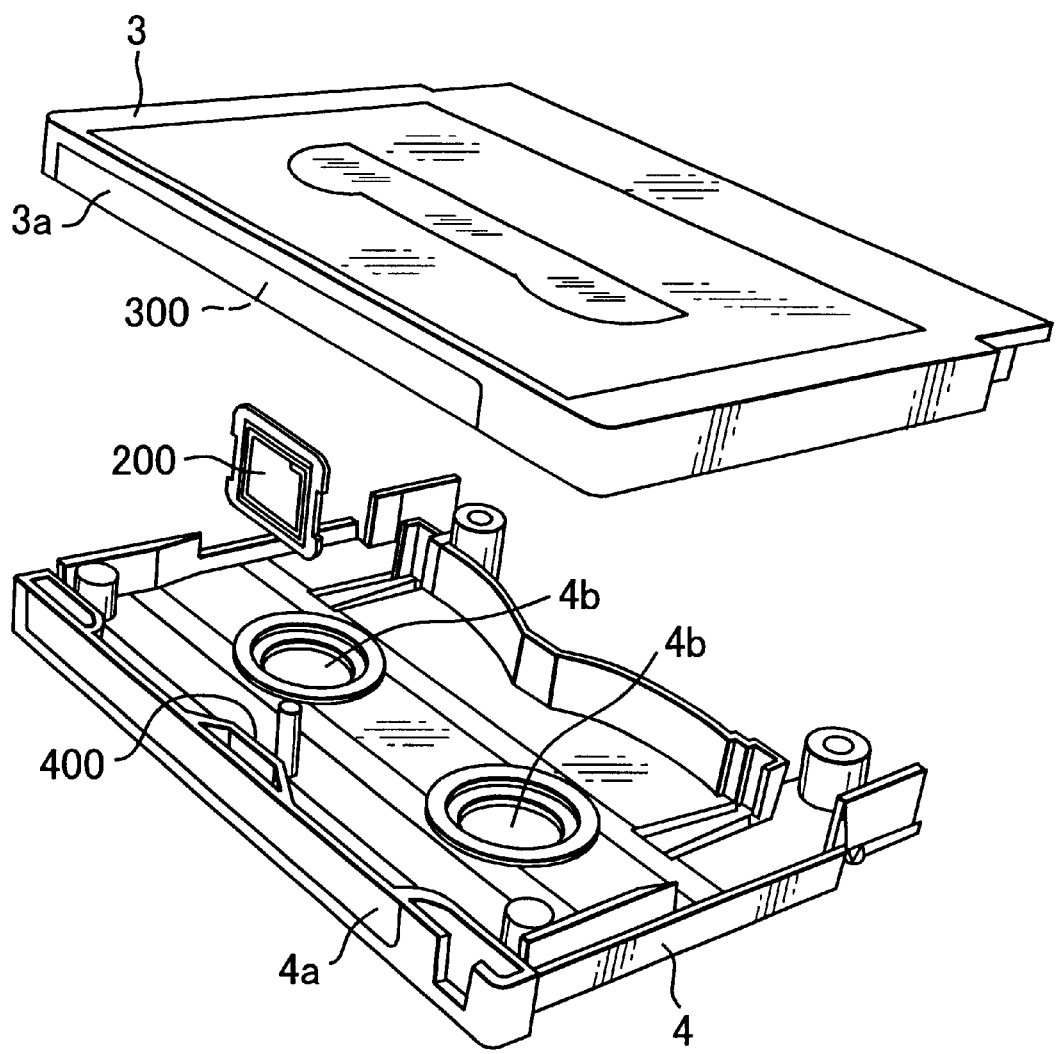
FIG. 8 is a perspective exploded view showing the upper shell and lower shell.
Figure 9:
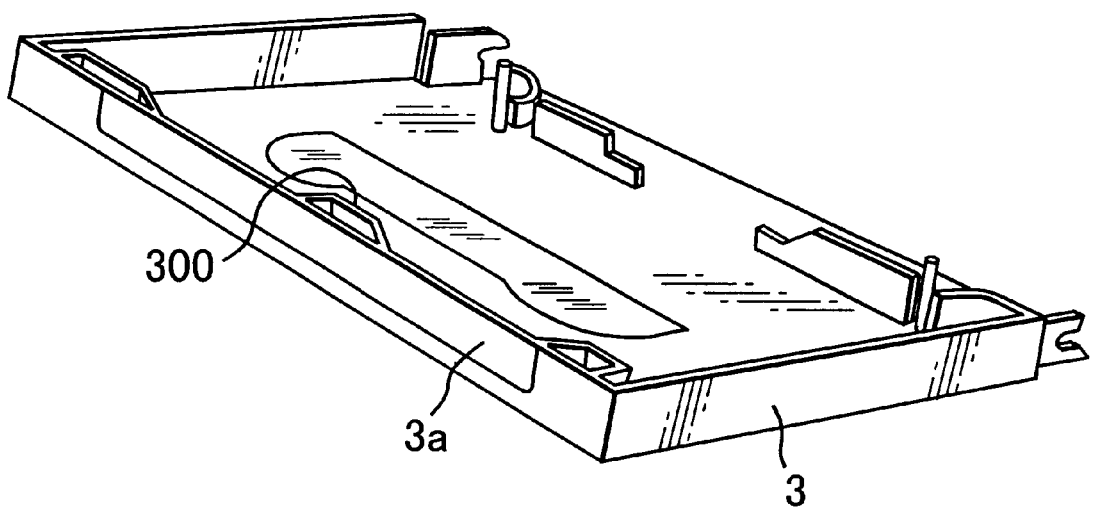
FIG. 9 is a perspective view showing the inner side of the upper shell.

The memory support section is next described while referring to FIG. 8, FIG. 9 and FIG. 10.

FIG. 8 is a perspective exploded view showing the upper shell 3 and the lower shell 4.

FIG. 9 is a perspective view showing the inner side of the upper shell 3.

A memory support section 400 is formed integrated into the inner side of the center section of the label surface 4a of the lower shell 4 as shown in FIG. 8. Also, as shown in FIG. 9, a memory support section 300 is formed integrated into the inner side at the center section of the label surface 3a of the upper shell 3.

Figure 10A:
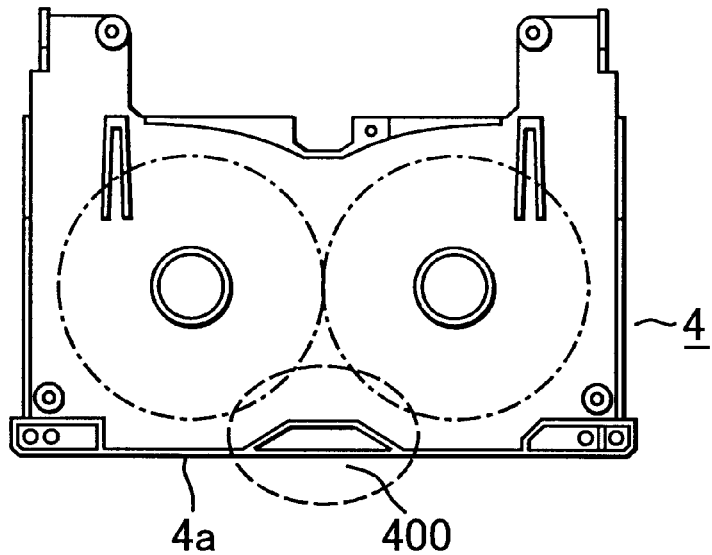
FIG. 10A is a flat view showing the inner side of the lower shell.
Figure 10B:
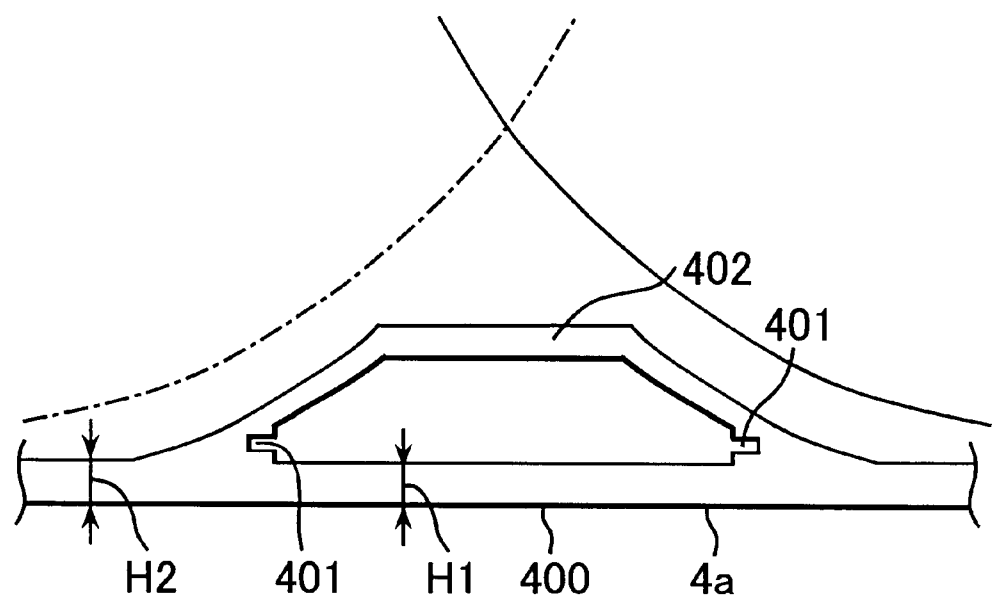
FIG. 10B is an enlarged view showing the memory support section.

FIG. 10A is a flat view showing the inner side of the lower shell 4 shown in FIG. 8. FIG. 10B is an enlarged view showing the vicinity of the memory support section 400 enclosed by a dashed line in FIG. 10A. Though not shown in the drawing, the memory support section 300 of the upper shell 3 has the same structure as shown in FIG. 10B.

As shown in FIG. 10B, in the memory section 400, the insertion grooves 401, 401 are formed as a positioning means capable of fitting and clamping the rear edge of the MIC 200. The MIC 200 can be supported by fitting the rear edge of the MIC 200 into the insertion grooves 401, 401. For example, by forming the memory support sections 300 and 400 in the same shape, the MIC 200 can be gripped and enclosed from above and below by the upper shell 3 and the lower shell 4 for installation in the tape cassette 1 as shown in FIG. 8.

A protective wall 402 is formed to be capable of partitioning the support section of the MIC 200, and formed for instance so even if the magnetic tape 5 has become slack, the slack portion will not make contact with the MIC 200.

The thickness H1 of the box at the memory support section 400 in the lower shell 4 is formed thinner than other sections having a thickness H2 so that the MIC 200 can be installed at a position in proximity to the outside of the box. In this way, a favorable communication environment for transmission and reception can be created.

The MIC 200 is described next.

Figure 11A:
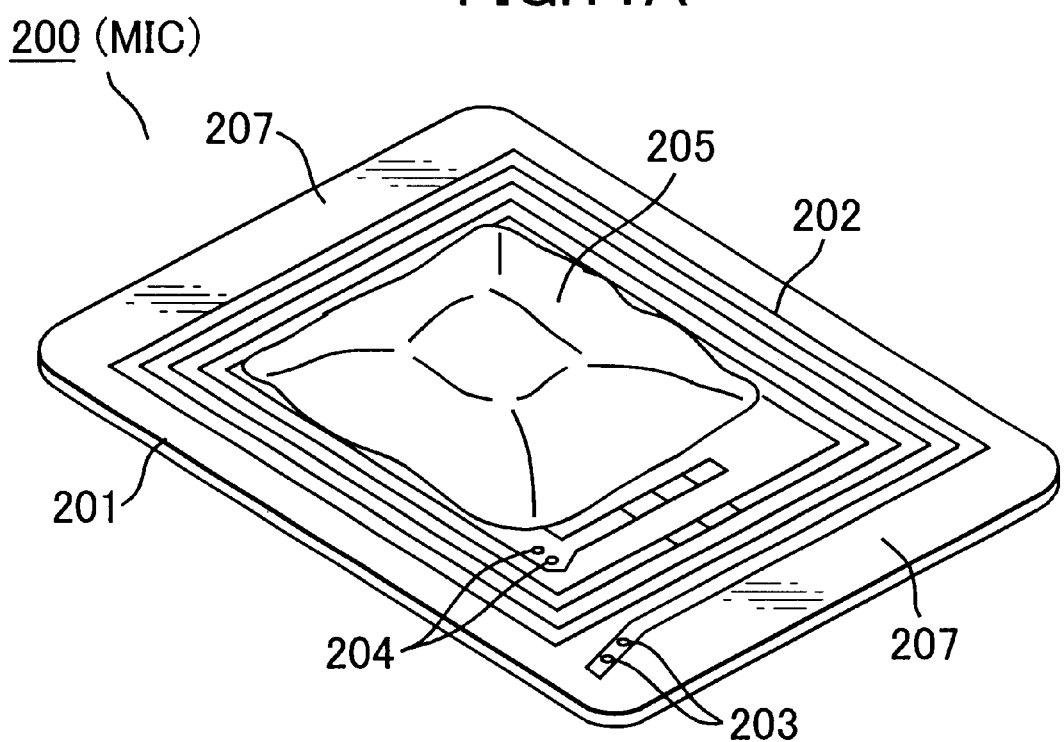
FIG. 11A is a drawing illustrating the structure of the MIC.
Figure 11B:
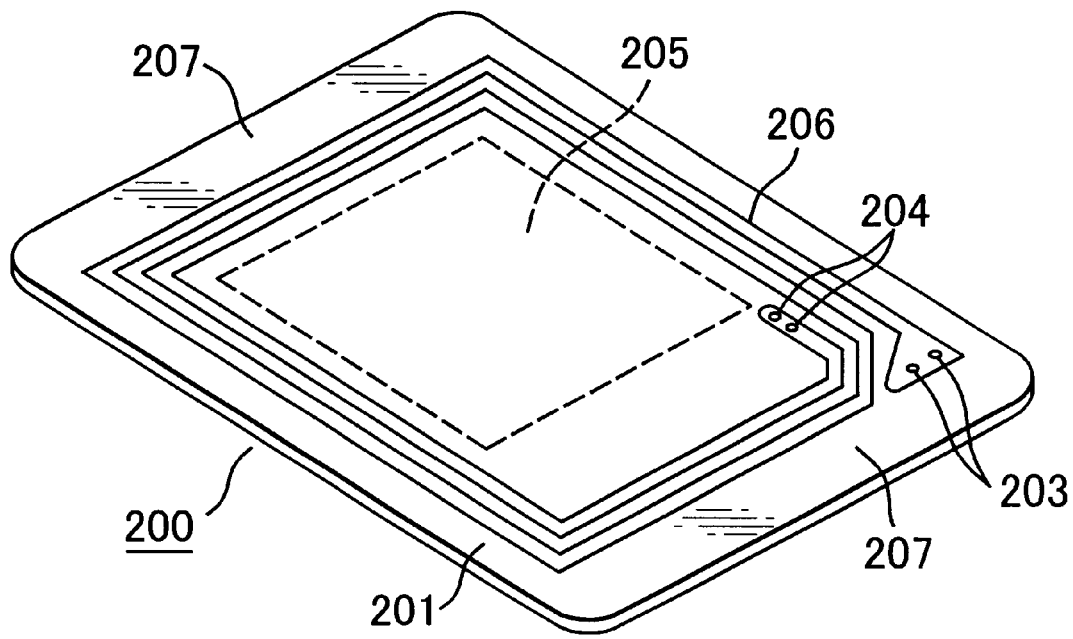
FIG. 11B is another drawing illustrating the structure of the MIC.

FIG. 11A and FIG. 11B are perspective views for describing the structure of the MIC 200. As shown in FIG. 11A, the MIC 200 is formed for example with an antenna section 202 constituted by a conductor element, on the compact circuit board 201. The antenna section 202 is connected to the antenna section 206 on the rear of the printed circuit board 201, by way of the through holes 203, 203 and through holes 204, 204. Therefore in the MIC 200, one antenna is formed by the antenna sections 202 and 206.

The memory storage area of the MIC 200 in the memory 205 is comprised for example of a non-volatile memory installed to connect to the antenna section 202 and sealed in place with the necessary amount of plastic. In this embodiment, the edges 207, 207 of the printed circuit board 201 are respectively fit into the insertion grooves 401, 401 as shown in FIG. 10B and installed in the tape cassette 1.

Figure 12A:
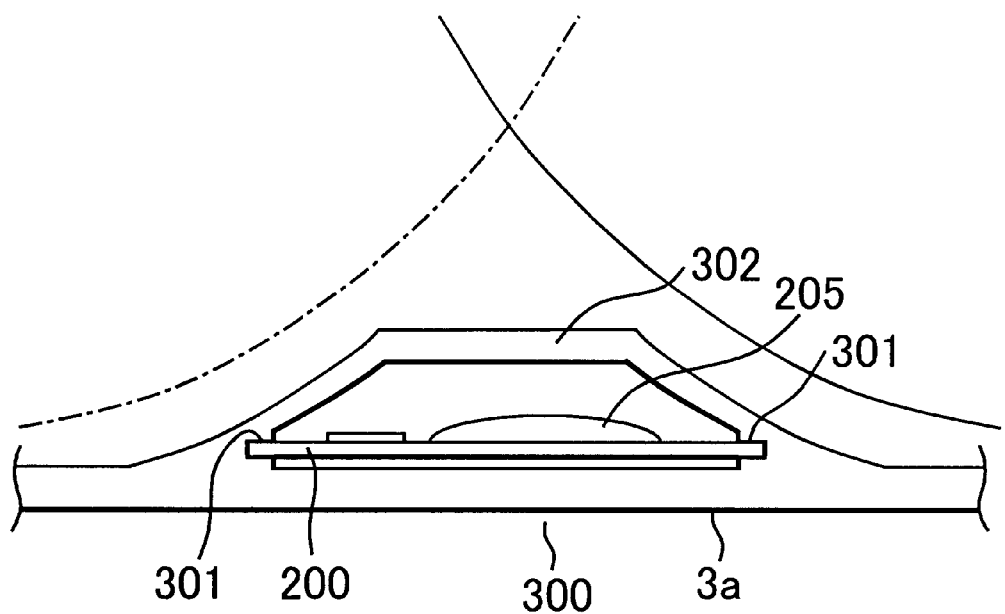
FIG. 12A is a drawing showing the installed state of the MIC in the memory support section.
Figure 12B:
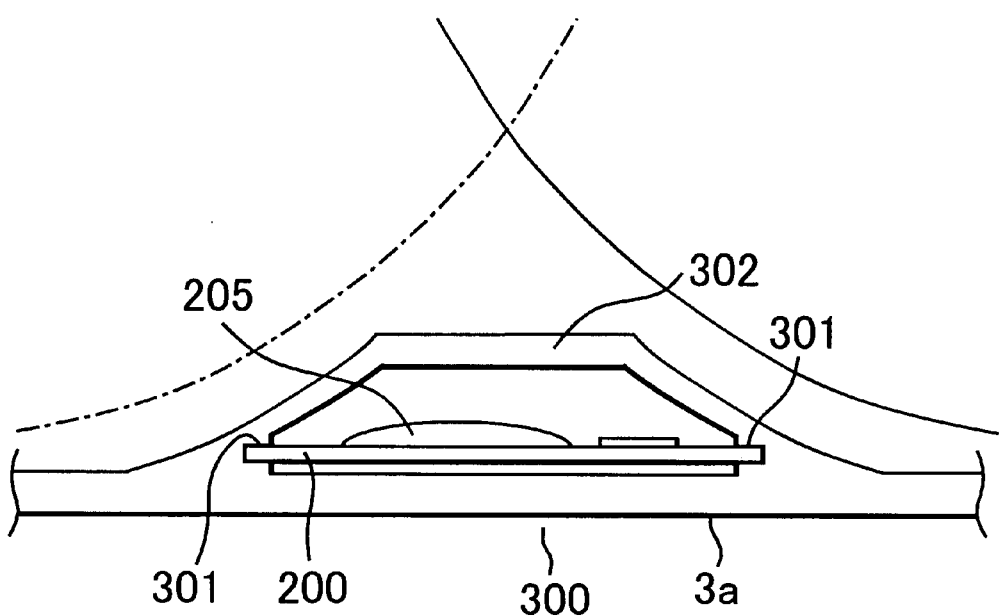
FIG. 12B is another drawing showing the installed state of the MIC in the memory support section.

FIG. 12A and FIG. 12B are drawings showing the MIC 200 of FIG. 11A and FIG. 11B installed in the memory support section 300.

When installing the MIC 200 in the memory support section 300, the edges 207, 207 of the MIC 200 are fit into the insertion grooves 301, 301 as shown in the figure, here however, the memory 205 is set as part of the inner side of the tape cassette 1 or in other words, the protective wall 302 side. In this way, the rear side not configured with the memory 205 is installed on the outer side, and the antenna section 206 can be brought closer to the label surface 3a (label surface 17). The MIC 200 is in this way installed so that the antenna section 206 is in a closer position to the outer side of the tape cassette 1, so that stable communication is possible between the MIC 200 and the communication means of the tape streamer drive.

If the rear side of the MIC 200 is set to face outwards, then as shown in FIG. 12B, the MIC 200 may be installed in a reversed longitudinal direction. In this case, the rear surface installed with the antenna section 206 can also be brought in proximity to the label surface 3a (label surface 17) so that the same as shown in FIG. 12A stable communication is possible between the MIC 200 and the communication means of the tape streamer drive.

(2) Description of Tape Streamer Drive

An example of the information storage device constituted by the tape streamer drive 31 is next described while referring to FIG. 1 through FIG. 5. A flat parallelepiped drive unit 32 comprises a chassis 33 and front panel 34 formed of plastic, and upper and lower covers 35, 36 press-machined from metal plate, etc. The chassis 33 is formed in roughly a box shape open on the left side, by a horizontal wall 33a, and by walls 33b having a pair of stop sections 37 on both left and right in an upright position on both the left and right sides of the horizontal wall 33a. A pair of parallel removable arms 38 integrated in a box shape open on the left side at the rear of both left-right edges of the front panel 34 are engaged with the pair of stop sections 37, so that the front panel 34 can be easily installed or removed in a straight or perpendicular state in the front edge of the chassis 33. The symmetrical upper and lower covers 35, 36 in box shape open on one side, are fit onto the chassis 33 from the top and bottom and installed removably by means of set screws and a stop structure.

A long horizontal cassette insertion slot 40 is formed horizontally in an upper position of the front panel 34. An inner lid 41 is perpendicularly installed on the inner side of the cassette insertion slot 40 to open inwards. The inner lid 41 is structured freely rotatably in the direction of the arrow e, in an upward rearward direction centering on a pair of left-right support pins 41a, and returnably rotatably in direction f, in a forward and lower direction by the return spring (not shown in drawing). An eject button 42 is installed at a lower position on one side of the front panel 34. A plurality of operation indicators 43 constituted by a plurality of LED (light emitting diodes) for showing operations such as whether a tape is loaded, record/play is in progress, tape-cleaning is in progress are formed in a horizontal row on another side of the eject button 42.

A cassette loading section 45 is formed at a frontal position, above the horizontal wall 33a of the chassis 33, and a tape loading device 61 is installed at a rear position. A left, right pair of reel shafts 46A, 46B are installed in a perpendicular state in the cassette loading section 45, and these reel shafts 46A, 46B are installed on the top ends of the motor shaft 48 mounted perpendicularly on a left/right pair of reel motors 47A, 47B. The left/right pair of reel motors 47A, 47B are installed perpendicularly on the horizontal motor circuit board 49 comprising a printed circuit board of plate metal. This motor circuit board 49 is horizontally fastened by a plurality of spacers to the bottom of the horizontal wall 33a of the chassis 33 with machine set screws, so the left/right pair of reel shafts 46A, 46B above the left-right pair of motor shafts 48 are installed protruding above the horizontal wall 33a. Positioning pins 50, 51 (front/back) and a left-right pair of loading guides 52 are installed horizontally to set the DAT cassette 1 horizontally above the horizontal wall 33a. A cone shaped positioning reference pin 50a for insertion into the positioning pin insertion hole 19 of the DAT cassette 1 is formed in the center section at the top edge of the front side positioning pin 50. The rear positioning pin 51 is installed at a position equivalent to the inner side area of the plurality of identification holes 16a through 16e in the ID (identification) hole section 15. A front lid opening protrusion 53 is formed perpendicularly on one of the front sides of the horizontal wall 33a.

A cassette loading device not shown in the drawing is installed on a position above the horizontal wall 33a of the chassis 33, inside the tape streamer drive 31. This cassette loading device is structured to slidably drive the DAT cassette 1 horizontally to the ejection position shown by the dotted line in FIG. 2, and in the retracted position shown by the dot-dash line in the direction of the arrows g, j, and also formed to drive upward in the direction of the arrows h and i between the lower position shown by the solid line and the upper position (retraction position) shown by the dot-dash line in FIG. 2. The cassette loading device is structured drivably by the forward or reverse rotation of the cassette loading motor 71 shown in FIG. 13.

Figure 5:
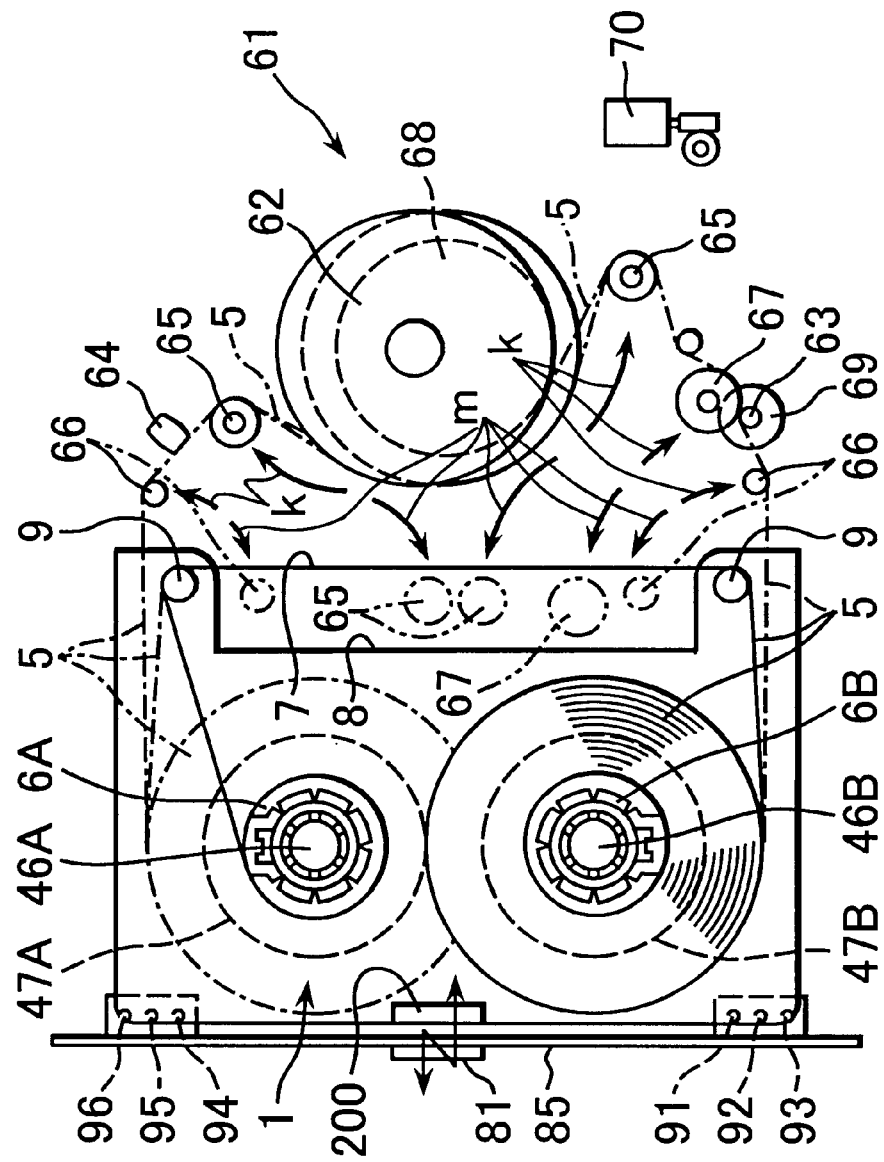
FIG. 5 is a concept flat view showing the tape loading device of the tape streamer drive of the same figure.
Figure 6:
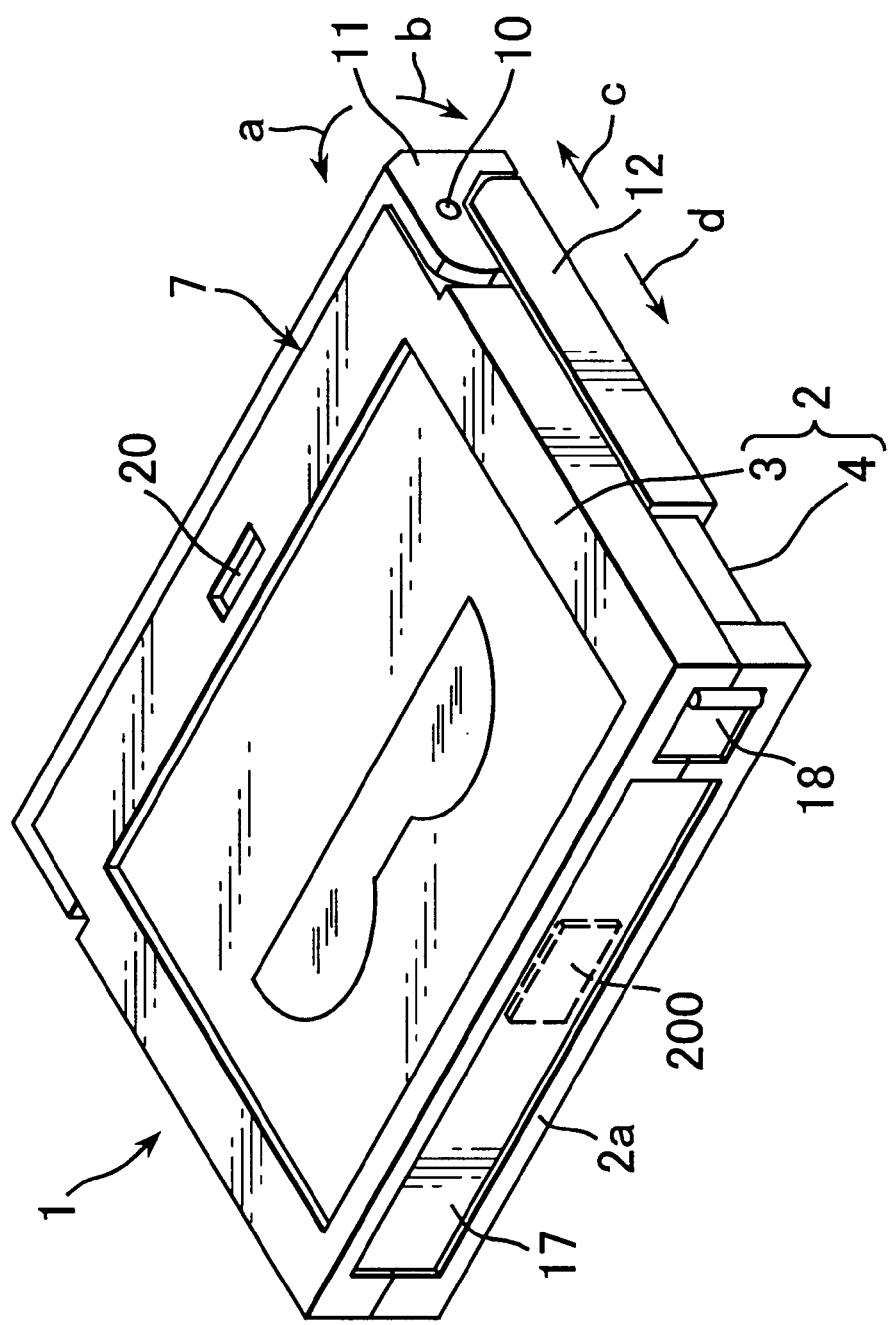
FIG. 6 is a perspective view of the DAT cassette as seen from above.
Figure 7:
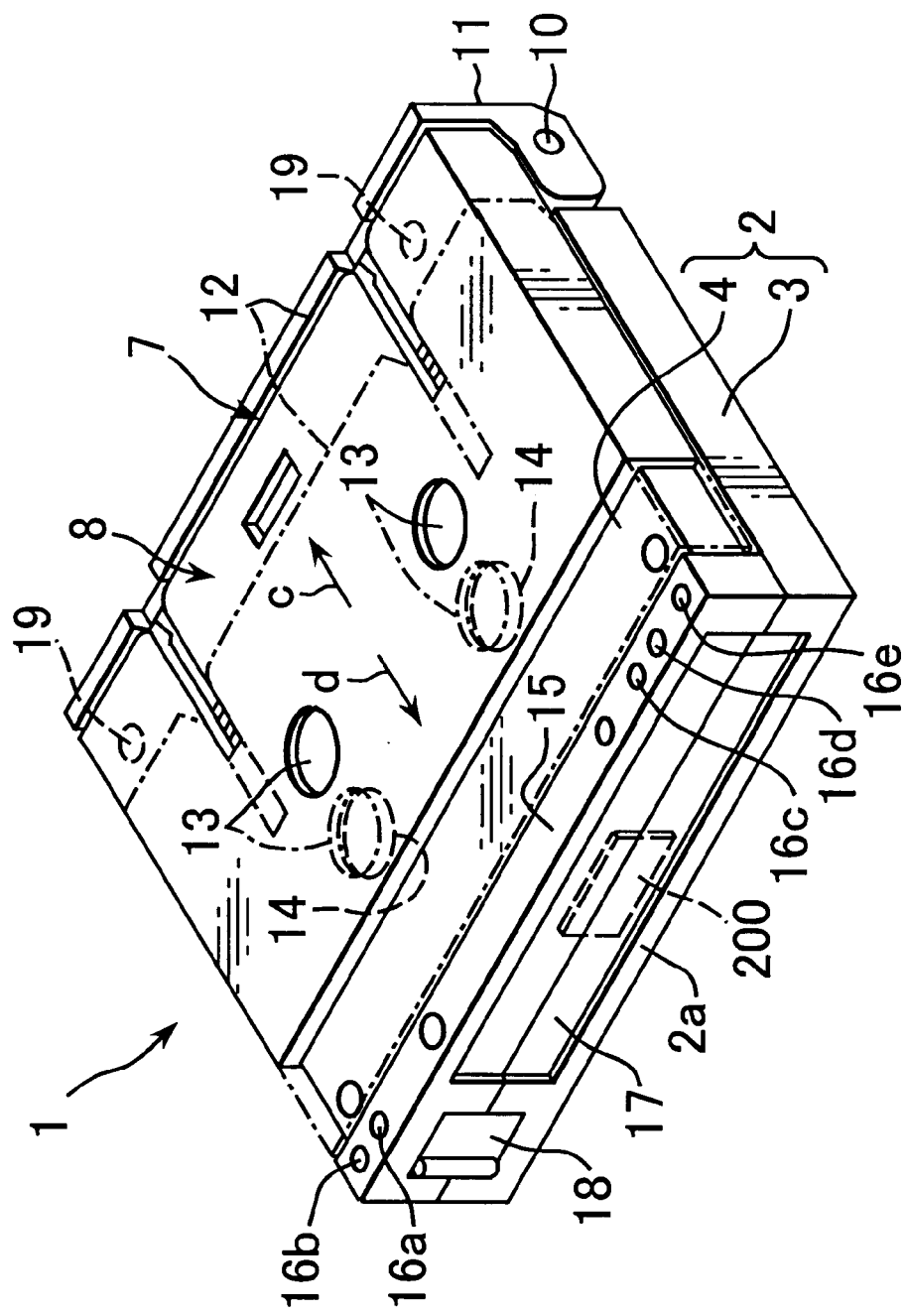
FIG. 7 is a perspective view of the DAT cassette as seen from below.

Further, as shown in FIG. 5, the tape loading device 61 installed at a rearward position from the cassette loading section 45 and above the horizontal wall 33a of the chassis 33, comprises a rotating head drum 62, a capstan 63 and audio head 64, a left-right pair of rotating guides 65 and extracting guide 66 and a pinch roller 67 for loading of the magnetic tape 5 into the rotating head drum 62. The rotating head drum 62 is installed at a specified tilted angle on one side versus the horizontal reference surface. The tape loading device 61 further comprises a plurality of motors including a drum motor 68 to drive the rotating head drum 62, a capstan motor 69 to drive the capstan 63 and a tape loading motor 70 to slidably drive the extracting guide 66 and a pair of rotating guide 65.

Now, the tape loading operation of the tape streamer drive is described. As shown by the dotted line in FIG. 2, the DAT cassette 1 is inserted in direction g, pushing the front lid 41, to the cassette insertion slot 40 of the front panel 34, the front lid 41 is pressed open by the DAT cassette 1, and the DAT cassette 1 is inserted in direction g up to a specified position within the cassette tape loading device. When inserted, the slider moves from the shut position shown by the solid line in FIG. 7 to the open position shown by the dot-dash line in the direction of arrow d, and simultaneously with the opening of the bottom rear opening 8, the left/right pair of hub holes 13 of slider 12 overlaps on the left/right pair of hub holes 14 directly below, and these hub holes 14 are opened. At this time, nearly simultaneous with self-locking of the slider 12 by the self-locking mechanism (not shown in drawing) inside the DAT cassette 1, the locking means of the cassette loading device (not shown in drawing) engages with the lock concave section 20 of the upper shell 3 of DAT cassette 1, and the DAT cassette 1 is locked within the cassette loading device.

Figure 13:
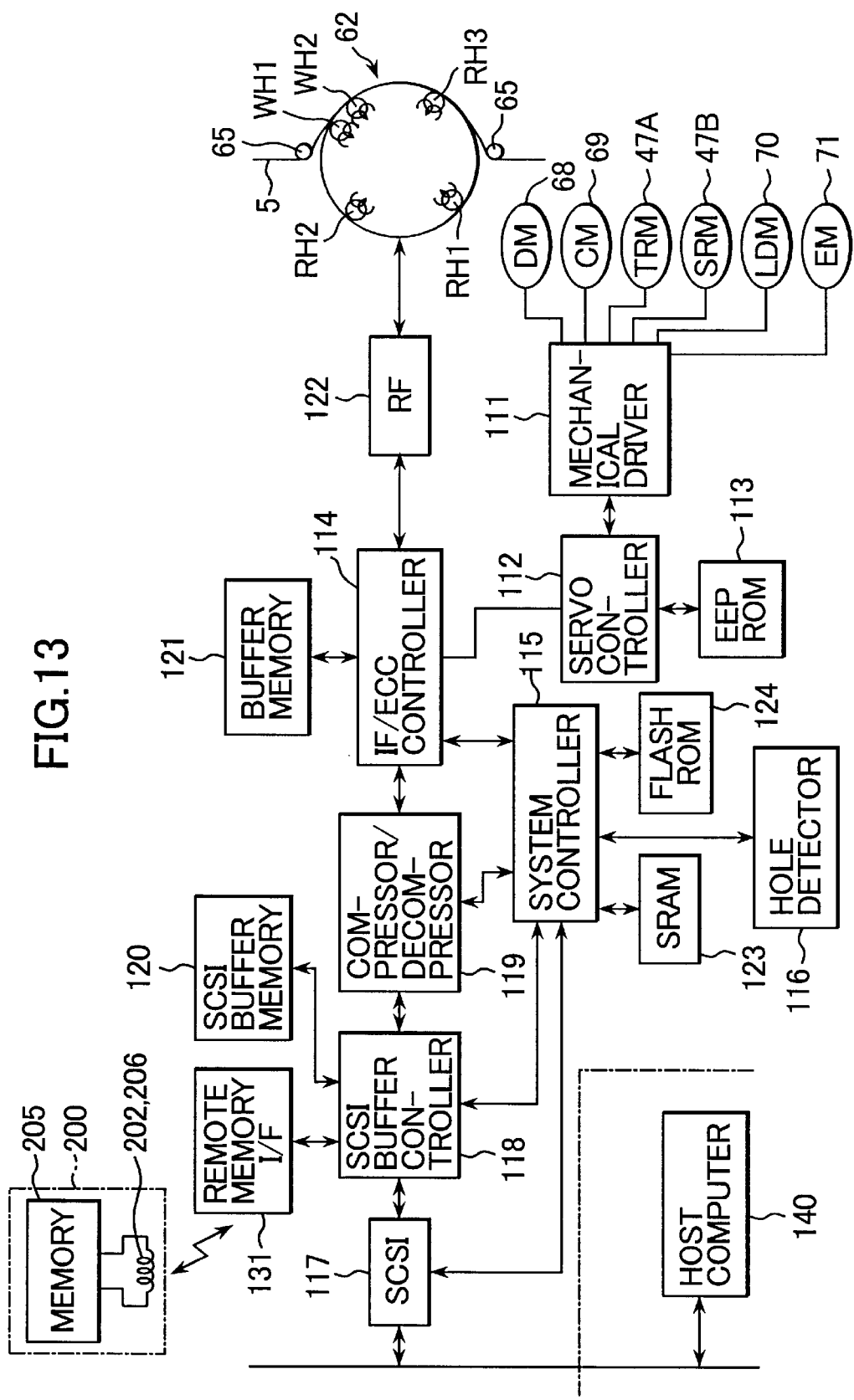
FIG. 13 is a circuit block diagram illustrating the MIC of the DAT cassette, and the tape streamer control circuit mounted on the main circuit board within the tape streamer drive.

The insertion of the DAT cassette 1 in the g direction within the cassette loading device is then detected by the detection switch (not shown in drawing). The cassette loading motor 71 shown in FIG. 13 is driven in the forward direction, and after the DAT cassette 1 is pulled completely into the drive unit 32 from the eject position shown by the dotted line in FIG. 2, to the pull-in position (raised position) shown by the dot-dash line directly above the cassette loading section 45, the cassette is moved from the pull-in position (raised position) and moved downward to the lower position shown by the solid line in FIG. 2 in the direction of the arrow h and loaded into the cassette loading section 45.

The DAT cassette 1 while guided by the left/right pair of loading guides 52 is loaded horizontally on the front/rear pair of positioning pins 50, 51 of the cassette loading section 45, and accurately positioned by a complementary positioning pin 50a inserted from below into the positioning pin insertion hole 19.

The front lid 11 of the DAT cassette 1 is pushed upward from below by the front lid opening protrusion 53, and the front lid 11 rotated in direction a, upwards while resisting the internal spring, and simultaneously, the pair of left/right reel shafts 46A, 46B are inserted into the DAT cassette 1 through the left/right pair of hub holes 13, 14, and the left/right pair of reel hubs 6A, 6B within the DAT cassette 1 are connected to the outer circumference of the pair of left/right reel shafts 46A, 46B. The inner lid 41 is then rotated by means of the cassette loading device (not shown in drawing) in the direction of arrow f from the open door position shown by the dot-dash line in FIG. 2, to the closed door position shown by the solid line, and the cassette insertion slot 40 is closed from the inner side. The completion of cassette loading is then detected by the cassette-in switch described later on, and the operation for loading the cassette is now completed.

At the completion of cassette loading, the tape loading operation then continues by means of the tape loading device 61.

In other words, by the process of cassette loading, the left/right pair of loading guides 65, extracting guide 66 and pinch roller 67 of the tape loading device 61 are inserted from below up to the dotted line, as shown in FIG. 5, on the inner side of the magnetic tape 5 passed by way of the bottom rear opening 8 between the left/right pair of tape guides 9 within the DAT cassette 1.

The tape loading motor 70 is then driven to rotate forward, based on the detection of the end of cassette loading detected by the cassette-in switch, and the left/right pair of loading guides 65, extracting guide 66 and pinch roller 67 are respectively driven to slide horizontally in the direction of arrow k from the position shown by the dotted line in FIG. 5 to the position shown by the solid line. The magnetic tape 5 is then drawn out horizontally from the front opening 7 of DAT cassette 1 to outside DAT cassette 1. Along with the magnetic tape 5 being loaded in approximately an M shape on the outer circumference of the rotating head drum 62 as shown in the dot dash line in FIG. 5, the magnetic tape 5 is also respectively passed along the capstan 63 and the audio head 64.

The rotating head drum 62 and the capstan 63 are then respectively rotatably driven by the drum motor 68 and the capstan motor 69, the magnetic tape 5 is pressed against the capstan 63 by the pinch roller 67, and when the left/right pair of reel hubs 6A, 6B of the DAT cassette 1 are rotatably driven by the left-right pair of reel motors 47A, 47B, the left/right pair of reel hubs 6A, 6B are turned along so that the magnetic tape 5 moves along the outer circumference of the rotating head drum 62, and data recording and or reproduction of the magnetic tape 5 is performed by helical scanning by the rotating drum 62.

After recording and or reproducing of the data, the tape unloading and the cassette unloading operations are performed in the reverse sequence of the above described cassette loading and tape loading operations.

In other words, the left/right pair of loading guides 65, extracting guide 66 and pinch roller 67 are respectively driven by the reverse rotation of the tape loading motor of tape loading device 61 as shown in FIG. 5, from the position shown by the solid line to respectively slide-return in the direction of arrow m to the position shown by the dot-dash line. Along with the above, one of the reel hubs 6A, 6B is rotatably driven by either or any one of the reel motors 47A, 47B, and the magnetic tape 5 wound up on either of those reel hubs so that the magnetic tape 5 is pulled back inside the DAT cassette 1 as shown by the solid line in FIG. 5, and is again passed between the left/right pair of tape guides 9.

Figure 2:
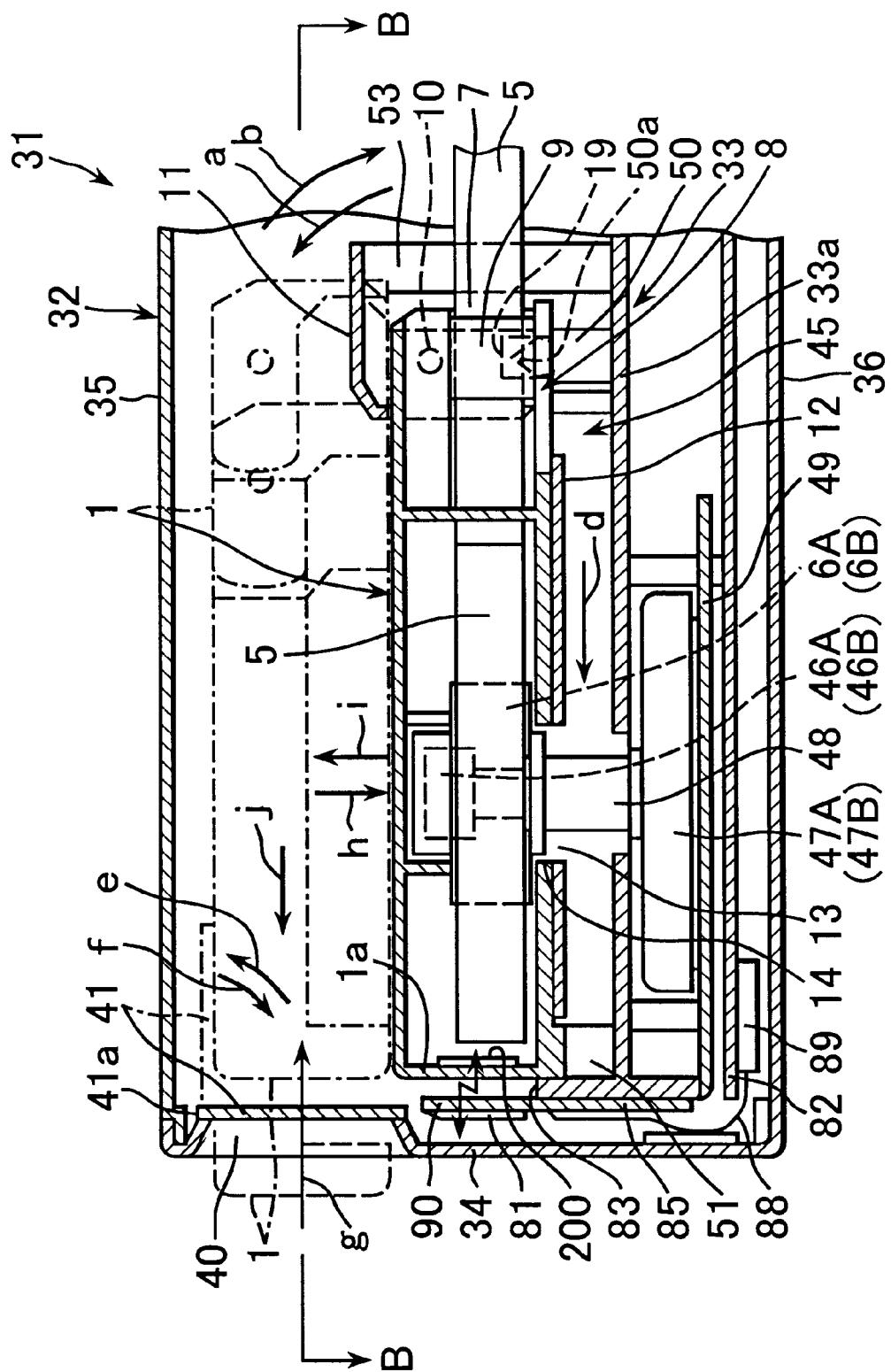
FIG. 2 is an enlarged cross sectional view taken along line A—A of FIG. 1.

Next, after the front lid 41 is again opened in the direction of arrow e as shown by the dot-dash line in FIG. 2, by the reverse rotation of the cassette loading motor 71 of the cassette loading device, the DAT cassette 1 is raised from the lower position shown by the solid line in FIG. 2, upwards in parallel with the direction of arrow i up to the upper position shown by the dot-dash line, and the front lid 11 of DAT cassette 1 is shut in the direction of arrow b. The DAT cassette 1 is then horizontally ejected from that upper position (retracted position) to the ejection position in the direction of arrow j shown by the dotted line, and the slider 12 is slid in the direction of the arrow c. The DAT cassette 1 is then extracted outwards by hand from the front panel 34 in the direction of arrow j.

(3) Description Involving MIC and Communication Antenna

The MIC 200 and the communications antenna 81 embedded in the rear edge wall 2a of the DAT cassette 1 are next described while referring to FIG. 1 through FIG. 5. The main circuit board 82 comprising a printed circuit board is horizontally installed with setscrews at a position below the motor circuit board 49 below the horizontal wall 33a of the chassis 33. A system control circuit described later is mounted on this main circuit board 82.

A circuit board support wall 83 at the center section of the front edge of the horizontal wall 33a of the chassis 33 is integrally formed perpendicularly in a right angle versus the longitudinal direction (or arrow g, j direction) of the horizontal wall 33a, and a left/right pair of board installation walls 84 are formed perpendicularly on the inner side of both left/right walls 33b.

The narrow switch circuit board 85 comprising a printed circuit board is closely mounted in parallel with the front side of the circuit board support wall 83 at the center section of the front edge of the chassis 33. The switch circuit board 85 is installed vertically on the left/right pair of board installation walls 84 at both left and right corners with a total of four setscrews 86, and in a position parallel with the inner side of the front panel 34. The switch circuit board 85 may not be installed on the chassis 33 with setscrews, but be positioned by a plurality of positioning sections 87 formed at the front end of the chassis 33, and pressed from the front side to the circuit board support wall 83 of chassis 33, with the clamps for the lower cover 36, so as to be clamped in a vertical position. The switch circuit board 85 and the main circuit board 82 are connected by a flexible printed circuit board 88 and connector 89 allowing attaching and detaching the main circuit board 82.

Then, as related later on, the memory drive circuit is mounted on the main circuit board 82 and the communications antenna 81 for the MIC 200 of that memory drive circuit is mounted on the switch circuit board 85.

Figure 3:
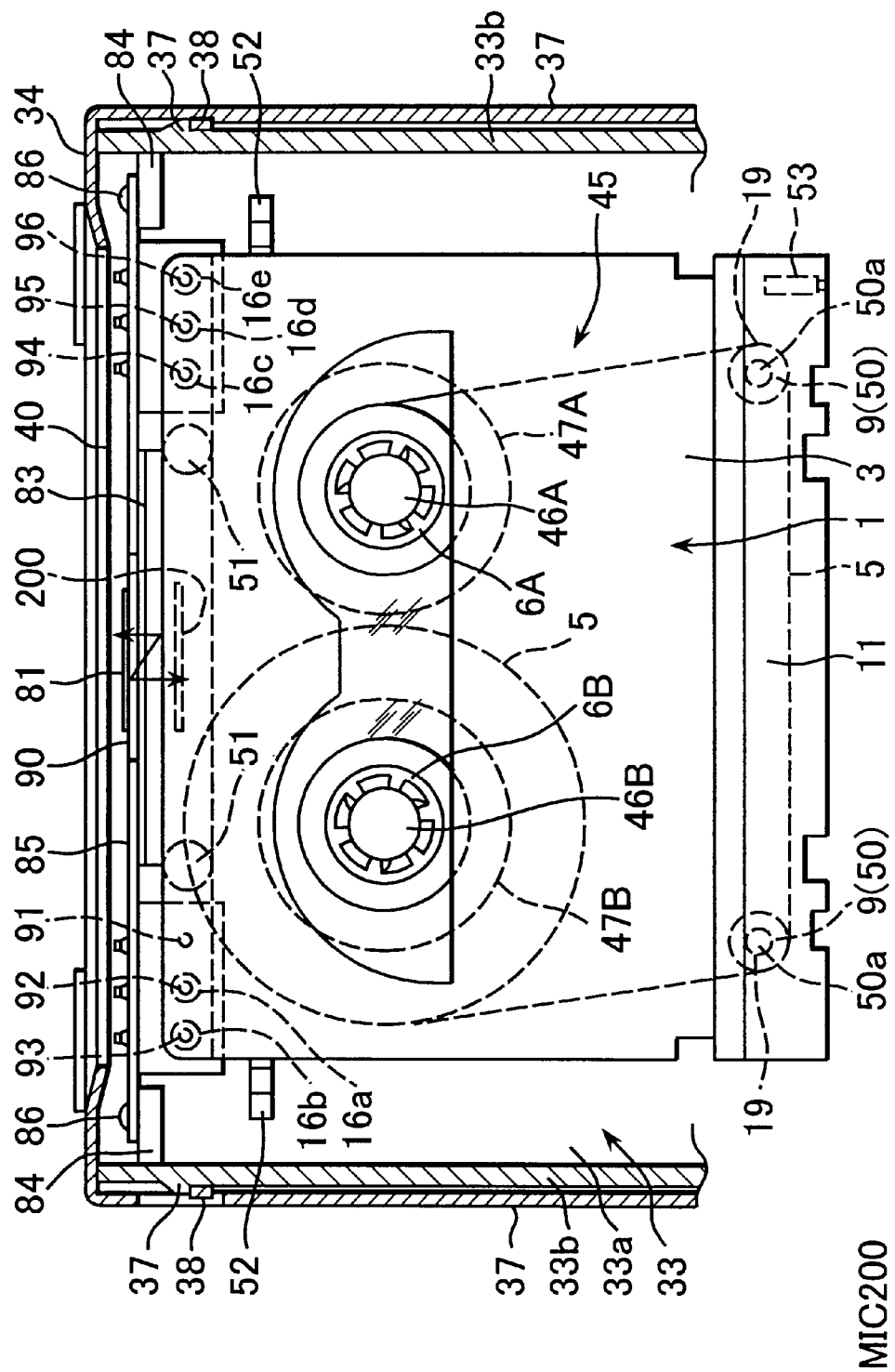
FIG. 3 is a flat cross sectional view taken along line B—B of FIG. 2.
Figure 4:
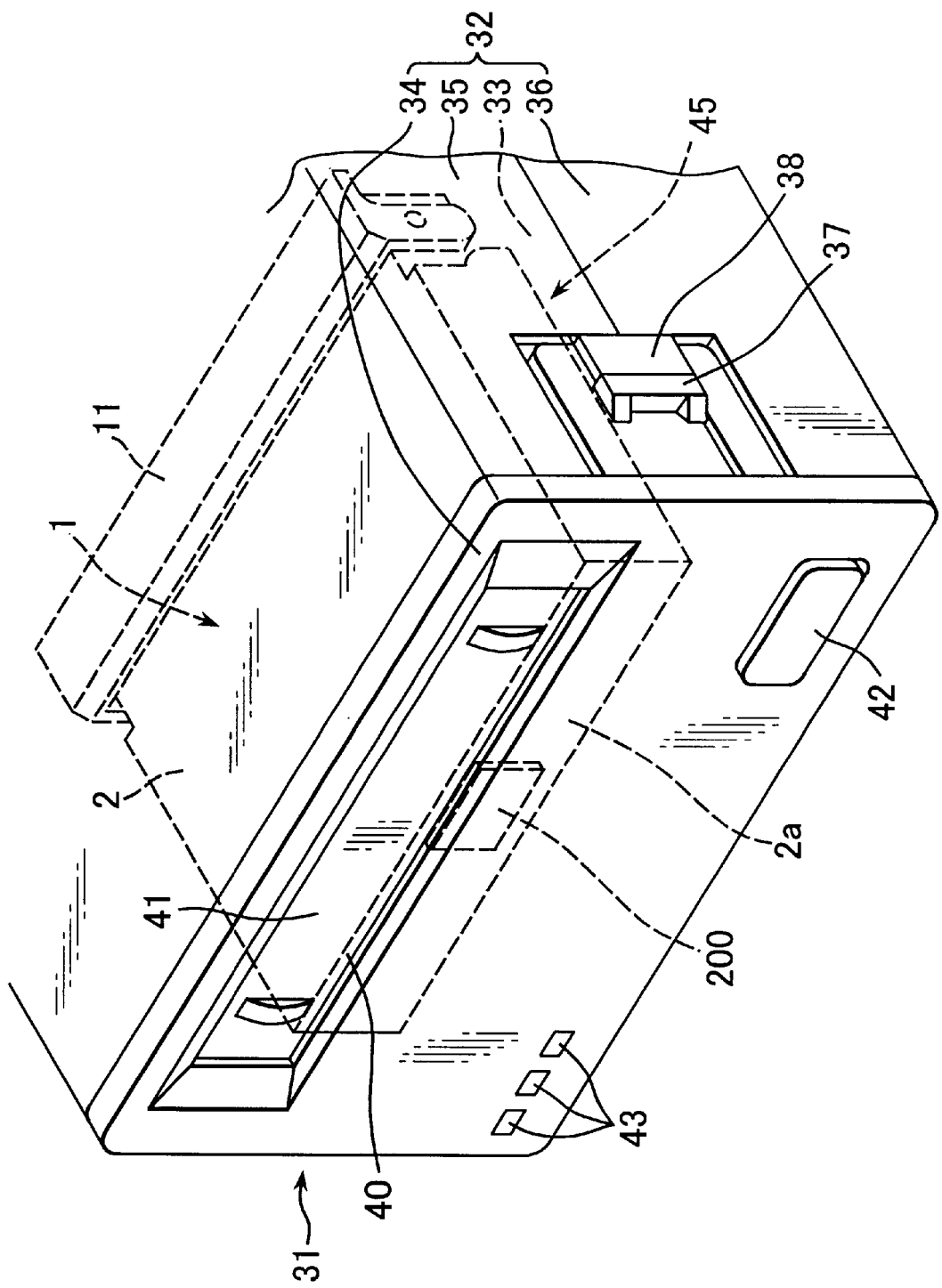
FIG. 4 is an external perspective view showing the side of the front panel of the tape streamer drive.

In other words, a protrusion 90 is formed integrated into the top edge of the center section on the left and right of the switch circuit board 85, and a communications antenna 81 formed by a copper foil pattern is mounted on the front side (or rear side) of the protrusion 90. Then, as shown in FIG. 1 through FIG. 3, the communications antenna 81 is installed at a position facing parallel to the front side of the MIC 200 of DAT cassette 1 mounted from the direction of arrow h horizontally in the cassette loading section 45. The communications antenna 81 is installed in a horizontal position in proximity to the inner side of the front panel 34.

A total of six detection switches 91 through 96 linked in threes and comprised of push switches are mounted face up on the left and right sides at the top/bottom intermediate positions on the rear side of the switch circuit board 85. The plurality of detection switches 91 through 96 comprise a cassette-in switch 91 for detecting the loading of the DAT cassette 1 in the cassette loading section 45, an anti-erasure detection switch 92 to detect if anti-erasure is on or off, and four types of detection switches 93 through 96 for identifying the type of DAT cassette 1.

Of the five identification holes 16a through 16e formed in the ID (identification) hole section 15 of the DAT cassette 1, the identification hole 16a is formed in the anti-erasure detection hole opened and closed by the write-protector 18. The other four identification holes 16b through 16e are formed in the type identification holes of the DAT cassette 1. A detailed description of the type identification holes of the DAT cassette is described later on while referring to FIG. 16.

An eject switch 97 is mounted at one end, on the bottom edge of the front side of the switch circuit board 85, and a plurality of operation indicators LED 98 are mounted in a row at the other end. The eject switch 97 is in proximity to the rear side of the eject button 42 of the front panel 34, and the plurality of operation indicators LED 98 face the plurality of operation indicator segments 43.

With the main switch circuit board 85 configured as described above, when the DAT cassette 1 is loaded horizontally in the direction of arrow h on the cassette loading section 45 on the inner side of the front panel 34, the cassette switch 91 of the level section (flat surface not formed with the plurality of identification holes 16a through 16e) of the ID hole section 15 of that DAT cassette 1, is pressed downward and turns on. The loading completion status of the DAT cassette 1 is detected, and the loading of the magnetic tape 5 by the previously described tape loading device 61 is implemented.

By loading the DAT cassette 1, the open/closed status of the anti-erasure detection holes 16a is detected by the anti-erasure detection switch 92, and along with identifying whether recording is allowed on the magnetic tape 5. Also the open/closed status of the type identification holes 16b through 16e of the DAT cassette 1 is detected by the other four type detection switches 93 through 96, and the type of DAT cassette 1 is identified based on these detection switches 93 through 96.

By loading the DAT cassette 1, the MIC 200 embedded internally in the rear edge of the DAT cassette 1 is brought in proximity to face parallel to the front of the communications antenna 81 mounted in the center of the switch circuit board 85.

Radio frequency (wireless) communication is carried out by radio waves with the MIC 200 by way of the communications antenna 81 by means of the memory drive circuit as described later on. Power is supplied to this MIC 200 and the writing and scanning various types of control information recorded on this MIC 200 is performed. Information such as the recording/reproducing time and format of the magnetic tape 5 are automatically set, and the correct recording and reproducing of data on the magnetic tape 5 can be performed.

By mounting the communications antenna 81 on the switch circuit board 85 with the total of six detection switches 91 through 96, the switch circuit board 85 can be combined with the antenna circuit board, and so the dedicated antenna circuit board installed on the chassis 33 mounted with the communications antenna 81 can be eliminated. A reduction in cost can therefore be achieved since fewer parts are used and fewer assembly processes are required. By loading the DAT cassette 1 into the cassette loading section 45, the MIC 200 is in close proximity and facing parallel with the communications antenna 81 so that the reading and writing of control information of the MIC 200 can be performed with high accuracy by means of the communications antenna 81.

Further, since the communications antenna 81 is positioned close to and in parallel to the inner side of the front panel 34, the various control information recorded on that MIC 200 can be written and read-out even if the MIC 200 of the DAT cassette 1 is only brought close to the communications antenna 81 from the outer side of the front panel 34.

(4) Description of the MIC and of the Tape Streamer Drive Control Circuit

The MIC of the DAT cassette 1, and the tape streamer drive control circuit 110 comprising the system control circuit and the memory drive circuit mounted on the main circuit board 82 of the tape streamer drive 31 are described next, referring to FIGS. 13 through 18.

Figure 15:
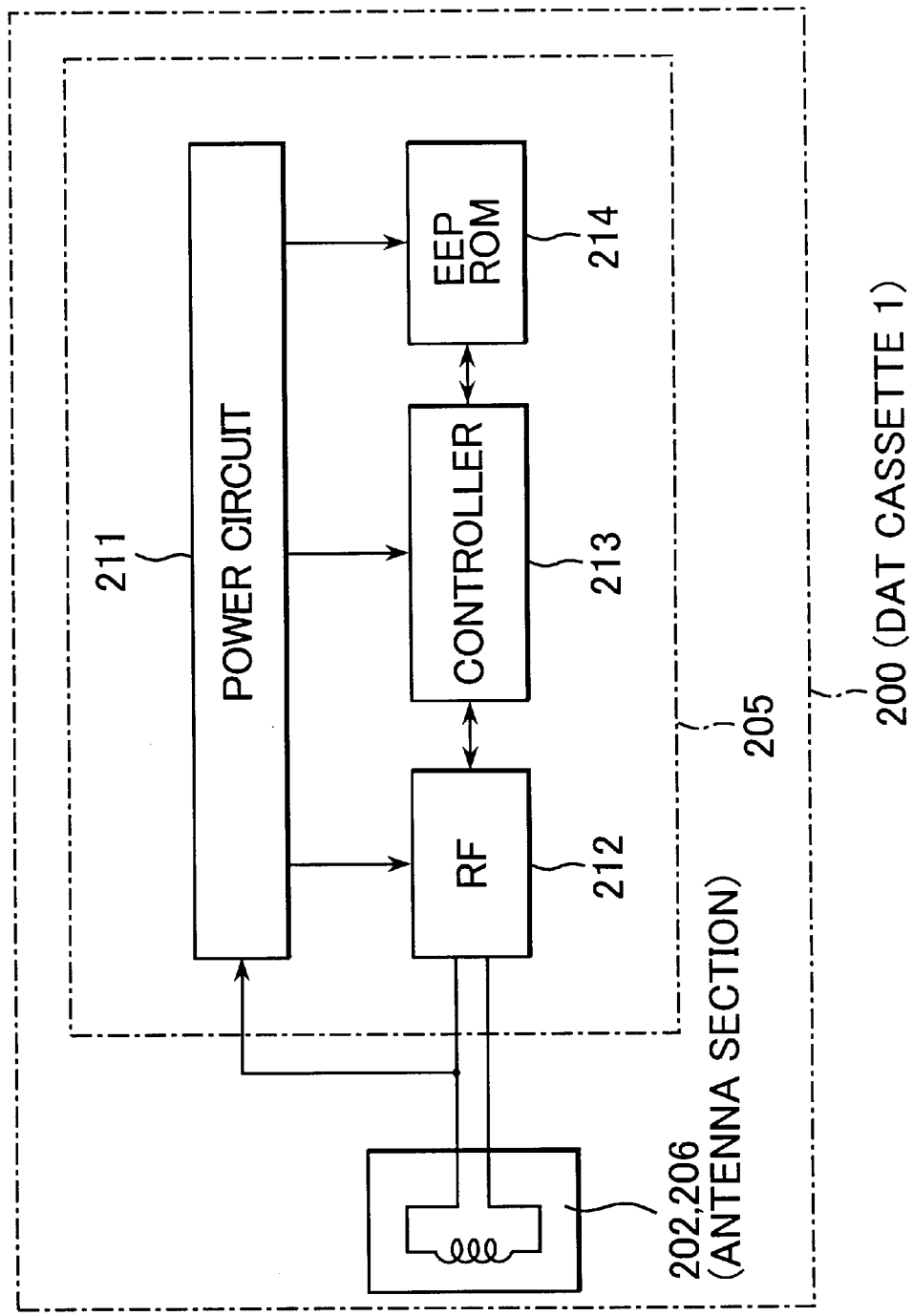
FIG. 15 is a circuit block diagram illustrating in detail the MIC in FIG. 13.

The MIC 200 embedded within the DAT cassette 1 as shown in FIG. 15, comprises a memory 205 and antenna sections 202, 206. The memory 205 is comprised for example of a power circuit 211 constituted by a semiconductor IC, a RF processor 212, a controller 213, and an EEP-ROM 214. A remote interface 131 may for example be mounted on the main switch circuit board 82, and the antenna section 102 may be formed by a copper foil pattern mounted on the switch circuit board 85. However, the remote interface 131 may also be mounted on the switch circuit board 85.

The MIC 200 is configured to receive electrical power externally and be driven through the communications antenna 81 without physical contact. In other words, the communication between the MIC 200 and the communication antenna 81 may for example utilize a carrier wave in the 13 MHz band, and the radio wave from the communication antenna 81 is received by the antenna sections 202, 206 and the carrier wave in the 13 MHz band is converted in direct current electrical power. This direct current electrical power is supplied as operating power to the RF processor 212, a controller 213, and an EEP-ROM 214.

The RF processor 212 demodulates the received information and modulates information for transmission. The controller 213 implements processing according to the decoded received signal and decoded information (command) from the RF processor 212 such as implementing writing/read-out processing for the EEP-ROM 214.

In other words, the MIC 200 sets to power-on when a radio wave is received from the communications antenna 81. The controller 213 implements the commands overlapped on the carrier wave and manages the data of the EEP-ROM 214 that constitutes the nonvolatile memory.

Identification information for each DAT cassette 1 such as the year-month-day of manufacture and manufacturing location, thickness of the magnetic tape 5, material, and type of tape cassette are recorded in the MIC 200. When the DAT cassette 1 is therefore loaded in the tape streamer drive 31, the identification information is read-out by way of the communications antenna 81. User information and information related to the usage history of the recorded data on the magnetic tape 5 are also stored in the DAT cassette 1.

Next, in FIG. 13, the tape streamer drive controller circuit 110 containing the memory drive circuit and system control circuit is described.

The tape streamer drive 31 as described previously, records and or reproduces (plays back) the data on the magnetic tape 5 of the loaded DAT cassette 1 by means of helical scanning utilizing the rotating drum 62. Two record heads WH1 and WH2 having different azimuth angles and three reproducing (playback) heads RH1, RH2 and RH3 having the respectively required azimuth angles are installed in the rotating drum 62. The tape streamer drive 31 as described before comprises a plurality of drive motors such as the reel motors 47A, 47B, the drum motor 68, the capstan motor 69, the tape loading motor 70 and the cassette loading motor 71. These drive motors are rotatably driven by voltages applied from the mechanical driver 111.

The mechanical driver 111 controls driving of the various drive motors based on control from the servo-controller 112. The servo-controller 112 then implements speed control of each drive motor, for driving the tape at a fixed speed drive during normal record/reproduction, tape drive during high speed reproduction (playback), tape drive during fast-forward and rewind, as well as control of operations such as loading of the DAT cassette, eject, tape loading and tape tension control, etc.

A frequency generator (FG) is installed in each drive motor to provide servo control signals for the drive motor via a servo-controller 112 and is configured to detect information on the rotation of each drive motor.

Based on these FG pulses, the servo-controller 112 determines the rotation speed of each drive motor so that the differential versus the target (desired) rotation speed for each drive motor is detected and voltage control implemented at the mechanical driver 111 to apply a voltage equivalent to the detected differential signals. And the rotation speed can therefore be controlled in a closed loop process. During fixed speed drive for recording/reproduction and the respective operations such as high speed search, fast-forward, rewind, the servo-controller 112 implements control so that each motor rotates at the target rotation speed matching the respective operation.

The fixed parameters used for servo control of each drive motor by the servo-controller 112 are stored in the EEP-ROM 113. The servo-controller 112 is connected in both directions with the EEP-ROM 113 and the system controller 115 constituting the system control circuit implements the process control of the entire system by way of the interface controller/ECC formatter 114 (hereafter listed as IF/ECC controller).

The hole detection device 116 comprises five detection switches 91 though 96 as described previously, and detects the type detection holes 16a through 16e formed to prearranged standards in the DAT cassette 1 and cassette-in detection, and also generates detection information for detecting the type of DAT cassette 1 and if the anti-erasure is on or off.

The detection information generated by the hole detection device 116 is supplied to the system controller 115. The type and the write protect settings status of the loaded DAT cassette 1 can be determined in the system controller 115.

The input and output of data in the tape streamer drive 31 utilizes an SCSI interface 117. During recording of data for example, data is sequentially input from the host computer 140 by way of the SCSI interface 117 in transmit data units constituting a fixed length record, and supplied to the compression/decompression circuit 119 by way of the SCSI buffer controller 118. The SCSI buffer controller 118 controls data transmission of the SCSI interface 117 but the SCSI buffer controller 118 contains a buffer means constituted by the SCSI buffer memory 120 to obtain the specified transfer speed for the SCSI interface 117.

A tape streamer drive system of this type may also have a mode for transmission of data from the host computer 140 in variable length data units.

If necessary, the compression/decompression circuit 119 can perform compression of the input data by a specified method. As one example of a data compression method, when for example utilizing a compression method using LZ coding, previously processed character strings are assigned a dedicated code and stored in a dictionary format. The previously input character string is compared with the contents of the dictionary, and if the input data of the character string matches the dictionary code, then the character string data is substituted into the dictionary code. However, data for input character strings are not matched to the dictionary code, a new code is sequentially assigned and registered in the dictionary. Data compress can therefore be performed by registering data of input character strings in the dictionary in this way, and substituting character string data with the dictionary code.

The output of the compression/decompression circuit 119 is supplied to the IF/ECC controller 114 and the IF/ECC controller 114 temporarily stores the output of the compression/decompression circuit 119 in the buffer memory 121. The data accumulated in the buffer memory 121 by the operation of the IF/ECC controller 114 is finally formed in data units of a fixed length equivalent to 58 tracks of the magnetic tape 5 referred to as group and this data is subjected to ECC formatting.

In this ECC formatting, an error correction code is added to the recording data, the data modulated to match the magnetic recording and then supplied to the RF processor 122.

In the RF processor 122, supplied recording data are subjected to amplification and record equalization and record signals are then generated. These record signals are supplied to the record heads WH1, WH2, and are recorded on the magnetic tape 5 by the record heads WH1, WH2.

In a brief description of the data reproduction (playback) operation, the recorded data on the magnetic tape 5 are read-out as an RF reproduction signal by the reproduction (playback) heads RH1, RH2, RH3 and the reproduced outputs are subjected to reproduction (playback) equalizing, reproduction block generation, binarization, decoding (such as Viterbi decoding), etc.

The signals that are read-out in this way are supplied to the IF/ECC controller 114 and error correction processing first performed. The data is then accumulated in the buffer memory 121, and then read-out at a specified point in time and supplied to the compression/decompression circuit 119.

In the compression/decompression circuit 119, if the data are determined to be compressed during recording by the system controller 115, then the data is decompressed and if determined to be non-compressed, then the data are passed along and output without performing any data expansion.

The data output from the compression/decompression circuit 119 are then output to the host computer 140 by way of the SCSI buffer controller 118, and SCSI interface 117 as reproduction (playback) data.

The MIC 200 inside the DAT cassette 1 is also shown in FIG. 13. When the DAT cassette 1 is loaded inside the tape streamer drive 31, the MIC 200 becomes capable of input and output of control information data in a physical non-contact state with the system controller 115 via the remote memory interface 131 constituting the memory drive circuit.

Figure 14:
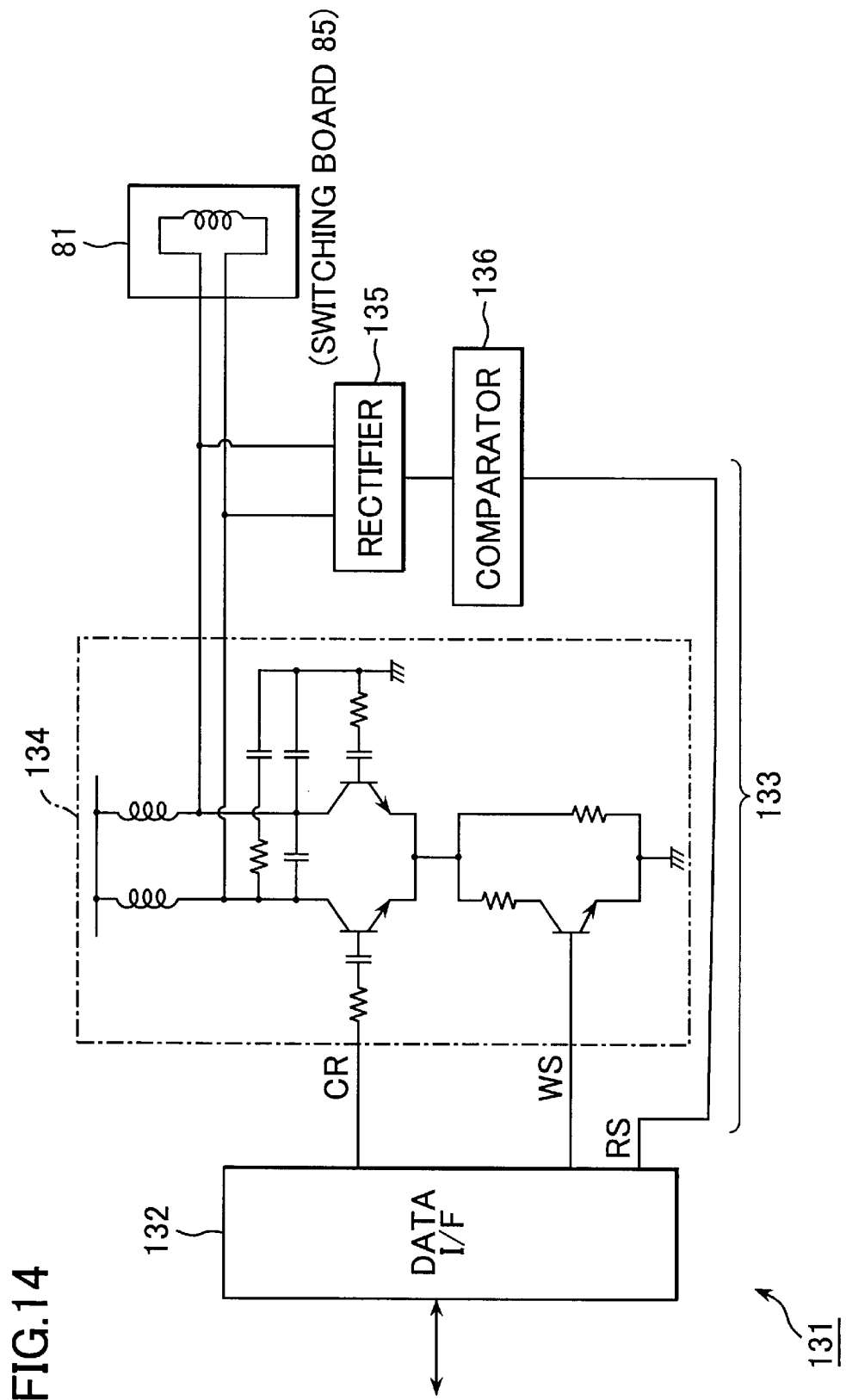
FIG. 14 is a circuit block diagram illustrating in detail the memory drive circuit in FIG. 13.

The remote memory interface 131 is next described while referring to FIG. 14.

The data interface 132 of this remote memory interface 131 performs data exchange with the system controller 151. As described later on, the transfer of data with the MIC 200 involves commands from the drive and an acknowledgment of those commands from the MIC 200, however when the system controller 115 issues commands to the MIC 200, the data interface 132 receives command data and clock signals from the SCSI buffer controller 118. Based on the clock signals the data interface 132 supplies command data to the RF interface 133. The data interface 132 also supplies a carrier frequency CR (13 MHz) to the RF interface 133.

In the RF interface 133 along with amplitude modulation (100 KHz) of the command (transmit data) WS and overlaying it on a carrier frequency CR, an RF modulator/demodulator circuit 134 amplifies that modulated signal and applies it to the communications antenna 81.

Command data from the communications antenna 81 is sent by wireless communication to the antenna sections 202, 206 of the MIC 200 inside the DAT cassette 1 by the RF modulator/demodulator circuit 134. In the DAT cassette 1, as shown the structure in FIG. 15, the command data is received by the antenna sections 202, 206 and the MIC 200 sets to power-on, and the controller 211 implements operation according to the contents of the commands. For example, data transmitted along with the write command are written in the EEP-ROM 214.

When commands are issued from the remote interface 131 in this way, the MIC 200 issues an acknowledgment of that command. In other words, as an acknowledgment, the controller 213 for the MIC 200 modulates and amplifies the data in the RF processor 212 and transmits an output from the antenna sections 202, 206.

When an acknowledgment of this kind is transmitted, and received at the communications antenna 81 of the remote interface 131, after rectifying that received signal in the rectifier circuit 135 of the RF interface 133, the rectified signal is demodulated as data in the comparator 136. The data is then supplied from the data interface 132 to the system controller 115. When a read-out command is for example issued from the system controller 115 to the MIC 200, the MIC 200 transmits read-out data from the EEP-ROM 214 along with the code constituting the acknowledgment. When the data is sent, the acknowledge code and read-out data is received and demodulated in the remote memory interface 131, and supplied to the system controller 115.

Returning here to FIG. 13, data is stored in the S-RAM 123, Flash ROM 124 by the system processor 115 using various processes.

Information such as parameters for example is stored in the Flash ROM 124 utilizing this control. The S-RAM 123 is also utilizes as a work memory, for processing and storage of data read-out from the MIC 200, data written on the MIC 200, mode data set in tape cassette units, and various flag data, etc.

The internal memory of the microcomputer comprising the system controller 115 may consist of the S-RAM 123 and the Flash ROM 124. A configuration using a portion of the area of the buffer memory 121 as the work memory may also be utilized.

In FIG. 13, an example was shown when the DAT cassette 1 containing the MIC 200 was loaded in the tape streamer drive. However, recording and reproducing can be performed even if a DAT cassette without containing a MIC 200 is loaded in the tape streamer drive 31. In this case, the control information of the DAT cassette 1 is recorded in the control zone formed on the magnetic tape 5 so that the tape streamer drive 31 can read-out the control information recorded on the magnetic tape 5 and can rewrite the control information.

Next, the open and close pattern combinations for the four identification holes 16b through 16e for identifying the type of DAT cassette 1 are described while referring to FIG. 16.

First, a "1" indicates the identification holes are in an open state, while a "0" indicates the identification holes are in a closed state.

For example, if the identification holes 16b through 16e are all closed, then this state indicates the thickness of the magnetic tape 5 is 13 μm, the width of the tracks formed on the magnetic tape 5 is 13. 6 μm and that the tape format is "DDS - - - Digital Data Storage". If for example, the identification holes 16b and 16d are open and the identification holes 16c and 16e are closed, this state indicates that the thickness of the magnetic tape 5 is 6.9 μm, the width of the tracks formed on the magnetic tape 5 is 9.1 μm and that the tape format is "DDS-3".

When the DAT cassette 1 is loaded in the tape streamer drive 31, the hole detection device 116 generates a "1" or "0" based on the open/closed pattern of the identification holes 16b through 16e. By supplying the open/closed hole information to the system controller 115, the type of tape cassette corresponding for example to recording formats such as "DDS" "DDS-2" "DDS-3" "DDS-4" and "DDS-5" can be identified. Further, identifying for example, the cleaning cassette for performing cleaning of the magnetic heads (recording head WH1, WH2, reproduction head RH1, RH2, RH3) of the rotating drum 62 is also possible.

DAT cassette identification information corresponding to the open/closed patterns of the identification holes 16b through 16e can also be recorded in the MIC 200. This identification information consisting of the open/closed patterns of the identification holes 16b through 16e can recorded for example as 4 bit data. When the data cassette 1 is loaded in the tape streamer drive 31, identification information can be detected by communication performed between the MIC 200 and the remote memory interface 131.

When for example, "0000b" is detected as identification information, the recording format can be identified as "DDS" and when "1010b" is detected as the same identification information, the recording format can be identified as "DDS-3".

One example of this embodiment is described as a pattern for identifying the type of DAT cassette 1 corresponding for instance to the DDS format, however the types of other DAT cassette formats can also be identified by this same open/closed hole information.

Figure 17:
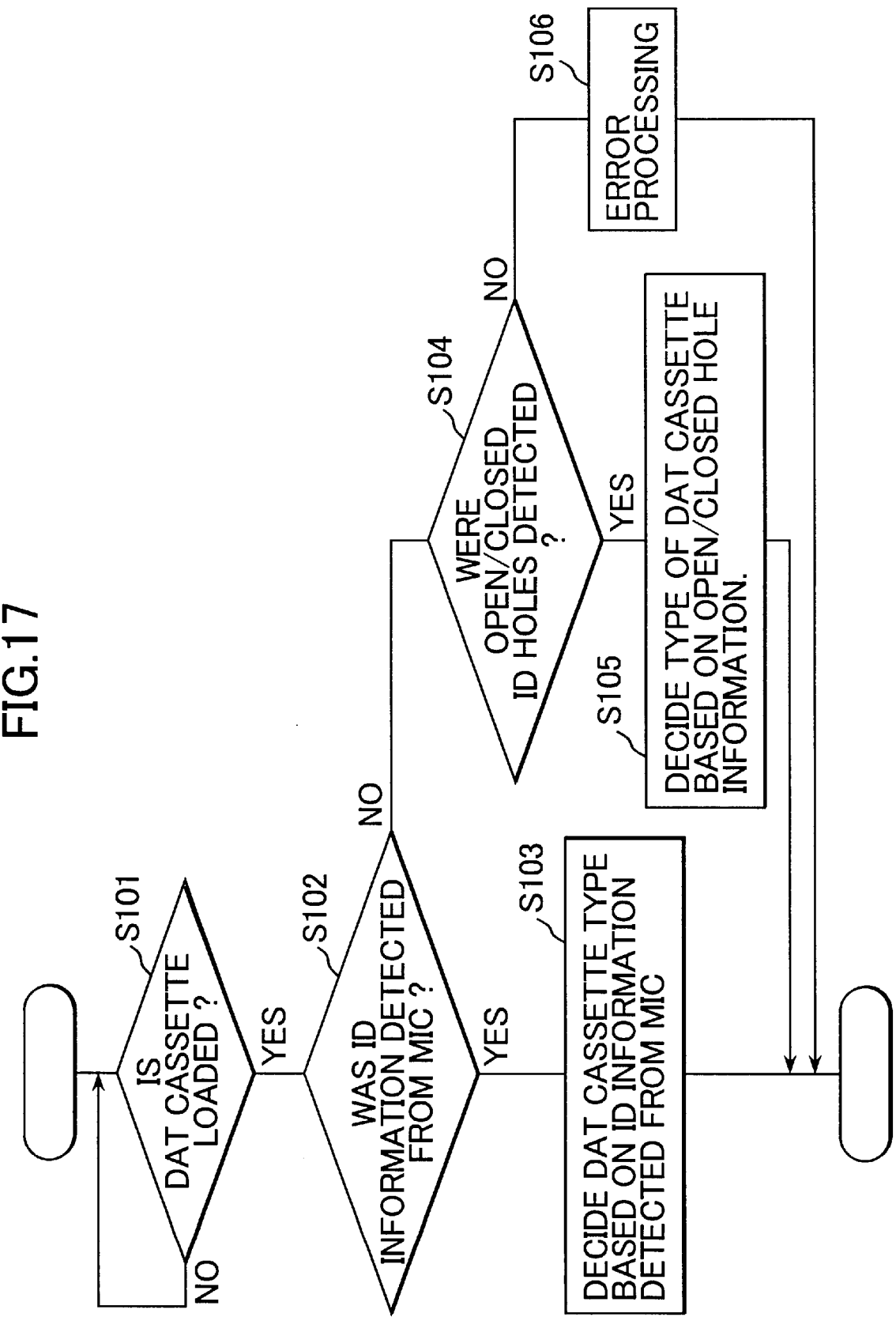
FIG. 17 is a flowchart showing an example of the process for identifying the type of DAT cassette.

FIG. 17 is a flowchart showing an example of the process for identifying the type of DAT cassette 1 loaded in the tape streamer drive 31 of this embodiment. When the DAT cassette 1 is loaded in the tape streamer drive 31 (S101), a check is first made to determine whether or not identification information from the MIC 200 has been detected (S102). When determined that identification information has been detected from the MIC 200, the type of DAT cassette 1 is then identified based on this identification information (S103).

Further, when in step 102, detection of identification information from the MIC 200 could not be performed for example because of communication problems with the MIC 200, or identification information was not recorded in the MIC 200, or the DAT cassette 1 did not contain the MIC 200, then the processing proceeds to step 104. In this step 104, a check is made to determine whether or not the open/closed pattern of the identification holes 16b through 16e could be detected. When found that the open/closed pattern of the identification holes 16b through 16e was detected, the type of DAT cassette 1 is then identified from the open/closed information based on the open/closed hole pattern (S105).

When determined in step S104 that an open/close pattern was not detected for identification holes 16b through 16e, then error processing is performed since information identifying the type of magnetic tape 5 could not be obtained from the loaded DAT cassette 1.

In this embodiment, the type of DAT cassette 1 is in this way identified based on identification information from the MIC 200 and when identification information from the MIC 200 cannot be detected, the type of DAT cassette 1 is identified based on the open/closed pattern of the identification holes 16b through 16e.

Therefore, even for example if the communication with the MIC 200 is poor, or even if the MIC 200 identification information is lost for some reason, the type of DAT cassette 1 can be identified based on the open/closed pattern of the identification holes 16b through 16e. Also, even in the case that a mechanical defect occurs in the detection switches in the hole detection device 116, the type of DAT cassette 1 can still be identified based identification information from the MIC 200.

This embodiment is described an example where the open/close pattern of the identification holes 16b through 16e is detected by the hole detection device 116 after processing of the MIC 200 identification information, however detection of the identification holes 16b through 16e with the hole detection device may also be performed first.

Figure 18:
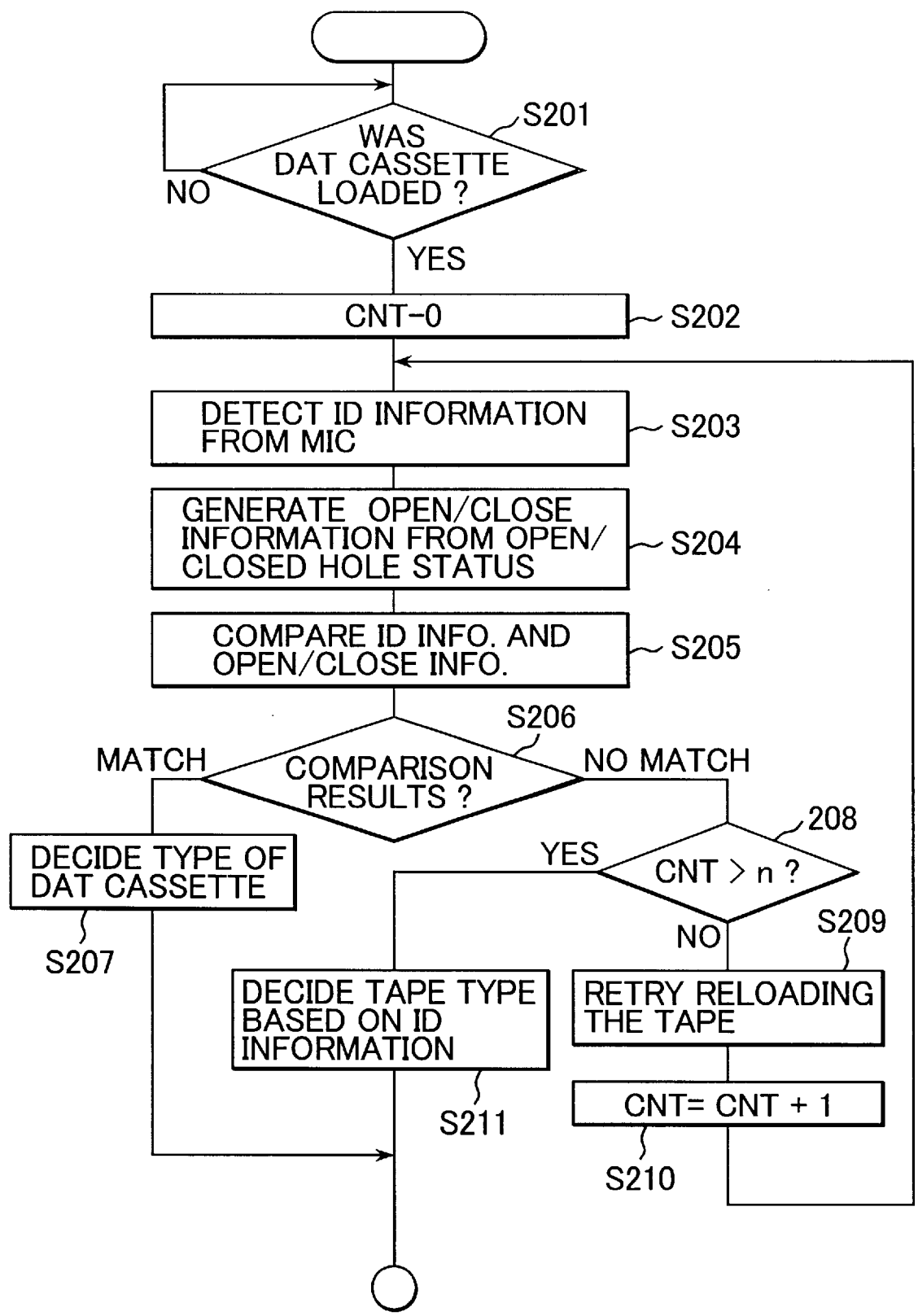
FIG. 18 is a flowchart showing another example of the process for identifying the type of DAT cassette.

Further, the open/close information generated by the hole detection device 116 and the identification information detected from the MIC 200 can be compared, and an example of the processing for identifying the type of DAT cassette 1 is described using the flowchart of FIG. 18. The retry counter described hereafter is a means for counting the number of times loading of the DAT cassette 1 is attempted. Before attempting a loading retry, a count of the number of times is made for example by the system controller 115 or the servo-controller 112.

When the DAT cassette 1 is loaded in the tape streamer drive (S201), first of all, the retry counter CNT is reset to "0" (S202), the identification information from the MIC 200 is detected (S203), and the open/closed information generated by the hole detection device 116 is detected (S204) The open/close information consisting of the identification information from the MIC 200 is compared with the hole detection device 116 (S205) and the results are determined (S206). When the comparison results are a match, the identification information detected in step 203 and the open/close information detected in step S204 are determined to be correct, and the type of DAT cassette 1 is confirmed (S207).

When the comparison results in step S206 are found not to match, then a check is made as to whether the retry counter CNT value is "n" or more (S208). When the check then shows that the retry counter CNT value is less than "n", the comparison mismatch is determined to be due to the identification hole 16b through 16e and detection switches of the hole detection device 116 not being at the correct positions per the cassette loading (seating) position, and retries of the DAT cassette 1 loading (or seating) are performed (S209) The retry counter CNT then starts counting upwards (S210), identification information is detected (S203), and the open/close pattern of identification holes 16b through 16e are detected (S204).

When determined in step S206 that the comparison results are a match, then the correct information was detected by the loading retry (S209), and based on the detected identification information and open/closed information, the type of DAT cassette 1 is identified (S207).

When determined that the comparison results are a mismatch even after retries were attempted, if the retry counter CNT value is found to be more than "n" in step S208, then the type of magnetic tape 5 is identified based on the identification information detected from the MIC 200 (S211). In other words, if due for example to defect of a hole detection device or to a factor such as the shape of the identification holes 16b through 16e, the correct closed/open information cannot be obtained even after the specified number of retries, then identification of the type of magnetic type 5 is performed only with the identification information.

Therefore, by comparing the identification information and open/closed information in the process in the flowchart shown in FIG. 18, not only the accuracy of the identification of the tape type can be improved but a determination can also be made based on the MIC 200 information as to whether detection accuracy of the hole detection device 116 is poor or not.

The embodiments of the present invention were described above, however the present invention is not limited by the examples in the embodiments and all types of modifications and variations are possible as is apparent to one skilled in the related art. In the embodiment for example, a tape cassette was utilized as the information storage cassette, and a tape streamer device was constituted the tape drive device serving as the information storage device. However, a disk cassette such as an optical disk may also serve as the information storage cassette of this invention, and an optical disk drive device may serve as the information storage device, and various types of information storage devices can be used to record data on various types of information recording (storage) medium by means of various types of recording methods.

The tape cassette of this invention as described above has a memory installed longitudinally on the inner central section of the rear surface of the box. The memory installed in this position exerts no effects on the tape winding or the various detection holes. The magnetic tape and memory therefore do not interfere with each other in the cassette box and the magnetic tape can run without any effects on the memory.

Further, by utilizing the longest section of the cassette rear side, an antenna of sufficient length can be formed so that an improved communications environment can be created when performing transmission or reception.

The memory can be housed within the (cassette) box so that the rear side can be formed for example as a flat surface. Accordingly, even if a label is attached to the rear side, letters can easily be entered on the label.

Also, by enclosing the memory from above and below by a support means forming an upper case and a lower case of the (cassette) box to clamp the memory, the memory can easily be installed at the specified position in the tape cassette. The memory is also clamped from the upper and lower parts of the (cassette) box so that a stable installation is achieved without the use of adhesives, etc.

The support means also comprises a protective wall capable of partitioning the support section of the memory and formed for example so even if the magnetic tape has become slack, the slack portion is prevented from making contact with the memory.

The memory also has the advantage of being capable of communication with external sections without direct physical contact so that there is no need for mechanical input/output devices such as contact points.

In the information storage device of the invention configured as described above, a memory recorded with different kinds of control information is embedded on the rear side of the cassette, and a communications antenna for performing communication of the different kinds of control information of the memory is mounted in a horizontal state on the switch circuit board on the inner side of the front panel at the front edge of the chassis, and when the cassette is inserted in the chassis into the cassette insertion slot on the front panel, the memory of that cassette is brought into proximity in front of the communications antenna on the switch circuit board so that irrespective of reading and writing different kinds of control information on the memory with high accuracy by way of the communications antenna. As the switch board can be combined with the antenna board and the dedicated antenna board thus eliminated, the benefit is obtained that a large cost reduction can be achieved by decreasing the number of parts required and the number of assembly processes required.

In the information storage device of the present invention, the communications antenna for communicating different types of control information with the memory is installed in a parallel state on the front panel, so that the memory embedded in the cassette is brought into proximity with the communications antenna from the outer side of the front panel and is provided an excellent and convenient arrangement for reading and writing of the different types of control information in the memory even if the cassette is not loaded in the drive.

What is claimed is:

1. An information storage device, comprising:
   a front panel formed with a cassette insertion slot installed at a front end of a chassis of the information storage device,
   an information storage cassette inserted into said cassette insertion slot into an interior of said front panel and loaded in said chassis,
   a non-contact memory storing various types of control information for an information recording medium inside the information storage cassette and embedded on a rear side of the information storage cassette,
   a switch circuit board installed on a front edge of said chassis and arranged in parallel with an inner side of said front panel, and
   a communications antenna mounted on said switch circuit board, in proximity to a front of said non-contact memory of said information storage cassette loaded in said chassis and the communications antenna implements wireless communications for different types of control information in the non-contact memory, wherein a plurality of detection switches for detecting a loaded information storage cassette and a plurality of control information are installed on said switch circuit board.

2. The information storage device according to claim 1, wherein said information storage cassette comprises:

a box capable of housing a magnetic tape, a guide opening for said magnetic tape formed at one end of said box, a freely opening and closing lid installed to open and close over the guide opening for the magnetic tape, a plurality of identification holes formed in a bottom surface edge of said box, and a slider for covering a reel hub hole section formed in a bottom of said box.

3. The information storage device according to claim 2, further comprising:

means for pushing open the freely opening and closing lid installed in the guide opening for the magnetic tape of said cassette box.

* * * * *